US009714657B2

(12) United States Patent
Uchida et al.

(10) Patent No.: US 9,714,657 B2
(45) Date of Patent: Jul. 25, 2017

(54) VARIABLE DISPLACEMENT VANE PUMP AND POWER STEERING SYSTEM

(71) Applicant: Hitachi Automotive Systems Steering, Ltd., Saitama (JP)

(72) Inventors: Yukio Uchida, Atsugi (JP); Hiroki Imanaga, Zama (JP); Satoshi Muramatsu, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 189 days.

(21) Appl. No.: 14/428,322

(22) PCT Filed: Feb. 19, 2014

(86) PCT No.: PCT/JP2014/053847

§ 371 (c)(1),
(2) Date: Mar. 13, 2015

(87) PCT Pub. No.: WO2014/156377

PCT Pub. Date: Oct. 2, 2014

(65) Prior Publication Data

US 2015/0226215 A1    Aug. 13, 2015

(30) Foreign Application Priority Data

Mar. 25, 2013   (JP) ................................ 2013-061666

(51) Int. Cl.
*F03C 4/00*   (2006.01)
*F04C 2/00*   (2006.01)
(Continued)

(52) U.S. Cl.
CPC ............ *F04C 14/223* (2013.01); *B62D 5/062* (2013.01); *F04C 2/04* (2013.01); *F04C 2/344* (2013.01);
(Continued)

(58) Field of Classification Search
CPC .......... F04C 2/344; F04C 2/04; F04C 14/226; F04C 14/223; F04C 14/24; F04C 14/26;
(Continued)

(56) References Cited

U.S. PATENT DOCUMENTS

| 6,155,797 A | 12/2000 | Kazuyoshi |
| 2001/0036412 A1 | 11/2001 | Konishi |
| 2002/0085923 A1 | 7/2002 | Konishi |

FOREIGN PATENT DOCUMENTS

| JP | 59-058186 | 4/1984 |
| JP | 59-137673 | 8/1984 |

(Continued)

*Primary Examiner* — Theresa Trieu
(74) *Attorney, Agent, or Firm* — Foley & Lardner LLP

(57) ABSTRACT

A variable displacement vane pump and a power steering can secure a discharge flow rate when a steering wheel is turned, and restrict the discharge flow rate when the steering wheel is not turned. In the variable displacement vane pump and power steering system, a bypass line is formed. The bypass line causes a hydraulic fluid in a high pressure chamber of a control valve, which controls an eccentricity of a cam ring, to flow directly to a low pressure chamber side of the control valve. The hydraulic fluid flows directly to the low pressure chamber side of the control valve when the steering wheel is turned.

20 Claims, 9 Drawing Sheets

(51) Int. Cl.
  *F04C 14/18*   (2006.01)
  *F04C 14/22*   (2006.01)
  *F04C 2/344*   (2006.01)
  *F04C 14/24*   (2006.01)
  *B62D 5/06*    (2006.01)
  *F04C 2/04*    (2006.01)
  *F04C 14/26*   (2006.01)
  *F04C 15/00*   (2006.01)

(52) U.S. Cl.
  CPC ............ *F04C 14/226* (2013.01); *F04C 14/24* (2013.01); *F04C 14/26* (2013.01); *F04C 15/0057* (2013.01); *F04C 2270/58* (2013.01); *F04C 2270/585* (2013.01)

(58) Field of Classification Search
  CPC .............. F04C 15/0057; F04C 2270/58; F04C 2270/585; B62D 5/062
  USPC ..... 418/24–30, 259–260, 266–268; 417/219, 417/220
  See application file for complete search history.

(56) References Cited

FOREIGN PATENT DOCUMENTS

| | | |
|---|---|---|
| JP | 09-226610 | 9/1997 |
| JP | 2000-087877 A | 3/2000 |
| JP | 2003-176791 | 6/2003 |
| JP | 3861594 B2 | 12/2006 |
| JP | 3933843 B2 | 6/2007 |

VARIABLE DISPLACEMENT VANE PUMP AND POWER STEERING SYSTEM

TECHNICAL FIELD

The present invention relates to a variable displacement vane pump and a power steering system.

BACKGROUND ART

Patent Literature 1 below discloses this type of technique. In the technique disclosed in Patent Literature 1, a passage having a throttle hole which connects a high pressure chamber of a variable displacement vane pump with a power steering system is provided parallel to another passage having a load sensitive valve provided therein. The load sensitive valve opens when a steering wheel is turned to thereby supply a total of a flow rate of hydraulic fluid which passes through the throttle hole and a flow rate of hydraulic fluid which passes through the load sensitive valve to the power steering system.

PRIOR ART LITERATURE

Patent Literature

Patent Literature 1: Japanese Unexamined Patent Publication No. 2003-176791

SUMMARY OF THE INVENTION

Problem that the Invention is to Solve

In the variable displacement vane pump described in Patent Literature 1, only the area of the flow path between the high pressure chamber and the power steering system is expanded when the steering wheel is turned, and the discharge flow rate of the pump itself is not increased. Therefore, there are fears that a sufficient discharge flow rate cannot be secured when the steering wheel is turned.

The invention has been made in view of these situations, and an object of the invention is to provide a variable displacement pump and a power steering system in which a discharge flow rate when a steering wheel is turned can be secured while restricting the discharge flow rate when the steering wheel is not turned.

Means for Solving the Problem

With a view to achieving the object, in a variable displacement vane pump and a power steering system of the invention, a bypass passage is formed which causes a hydraulic fluid in a high pressure chamber of control valve for controlling an eccentricity of a cam ring to go round to a low pressure chamber when a steering wheel is turned.

Advantage of the Invention

Consequently, it is possible to secure the discharge flow rate when the steering wheel is turned while restricting the discharge flow rate when the steering wheel is not turned.

MODE FOR CARRYING OUT THE INVENTION

Embodiment 1

[Configuration of Power Steering System]

Figure 1:
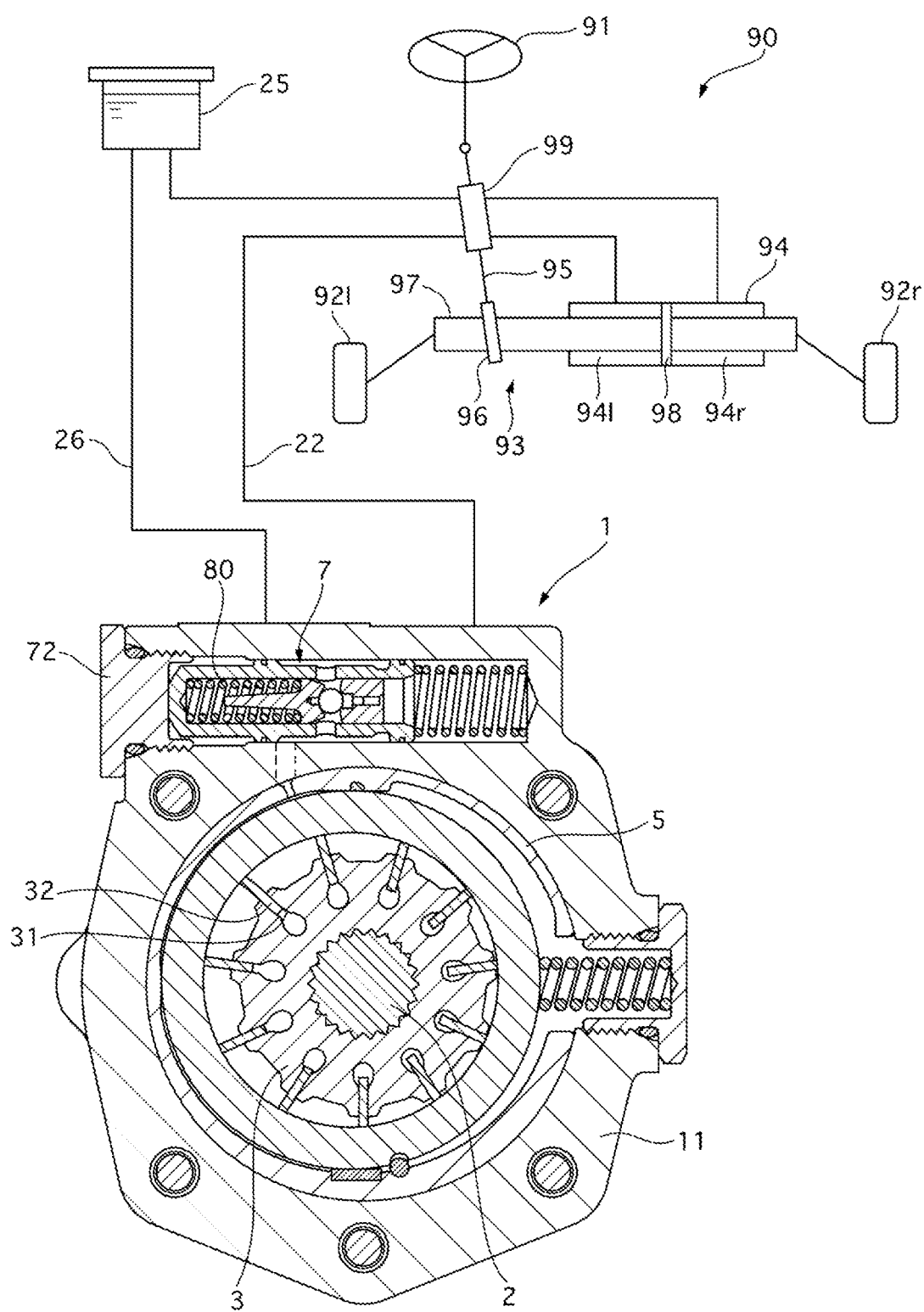
FIG. 1 is a schematic view of a power steering system of Embodiment 1 of the invention.

FIG. 1 is a schematic view of a power steering system 90 of Embodiment 1. The power steering system 90 includes a steering wheel 91 which is operated to turn by a driver, a steering mechanism 93 which turns left and right steered wheels 92*l*, 92*r* as the steering wheel 91 is turned, a power cylinder 94 which is provided in the steering mechanism 93 to generate an assisting force according to a steering effort applied to the steering wheel 91 by the driver, a variable displacement vane pump 1 which supplies a hydraulic fluid to the power cylinder 94, and a rotary valve 99 which supplies the hydraulic fluid discharged from the variable displacement vane pump 1 to the power cylinder 94 or to a reservoir tank 25 to reserve the hydraulic fluid.

The steering mechanism 93 comprises a steering shaft 95 which rotates together with the steering wheel 91, a pinion 96 which is provided at a distal end of the steering shaft 95, and a rack 97 which meshes with the pinion 96. Rotary motion of the steering wheel 91 is converted to linear motion by the pinion 96 and the rack 97, and the turned wheels 92 are turned by the motion of the rack 97.

An interior of the power cylinder 94 is divided into a left hydraulic pressure chamber 94*l* and right hydraulic pressure chamber 94*r* by a piston 98 which moves together with the rack 97. The rotary valve 99 is provided on the steering shaft 95.

The rotary valve 99 supplies the hydraulic fluid discharged from the variable displacement vane pump 1 to the left hydraulic pressure chamber 94l or the right hydraulic pressure chamber 94r of the power cylinder 94 or the reservoir tank 25 via a passage 22 according to a steered direction and a steered amount of the steering wheel 91. Specifically, when the steered amount of the steering wheel 91 is near zero (that is, when the steering wheel 91 is not turned), the rotary valve 99 discharges the hydraulic fluid to the reservoir tank 25. When the steering wheel 91 is turned to the left, the rotary valve 99 adjusts an amount of hydraulic fluid to be supplied to the right hydraulic pressure chamber 94r according to the steered amount, whereby a leftward assisting force is generated by the power cylinder 94. When the steering wheel 91 is turned to the right, the rotary valve 99 adjusts an amount of hydraulic fluid to be supplied to the left hydraulic pressure chamber 94l according to the steered amount, whereby a rightward assisting force is generated by the power cylinder 94. The hydraulic fluid which becomes unnecessary after the adjustment of the amount of hydraulic fluid is discharged to the reservoir tank 25.

[Summary of Vane Pump]

Figure 2:
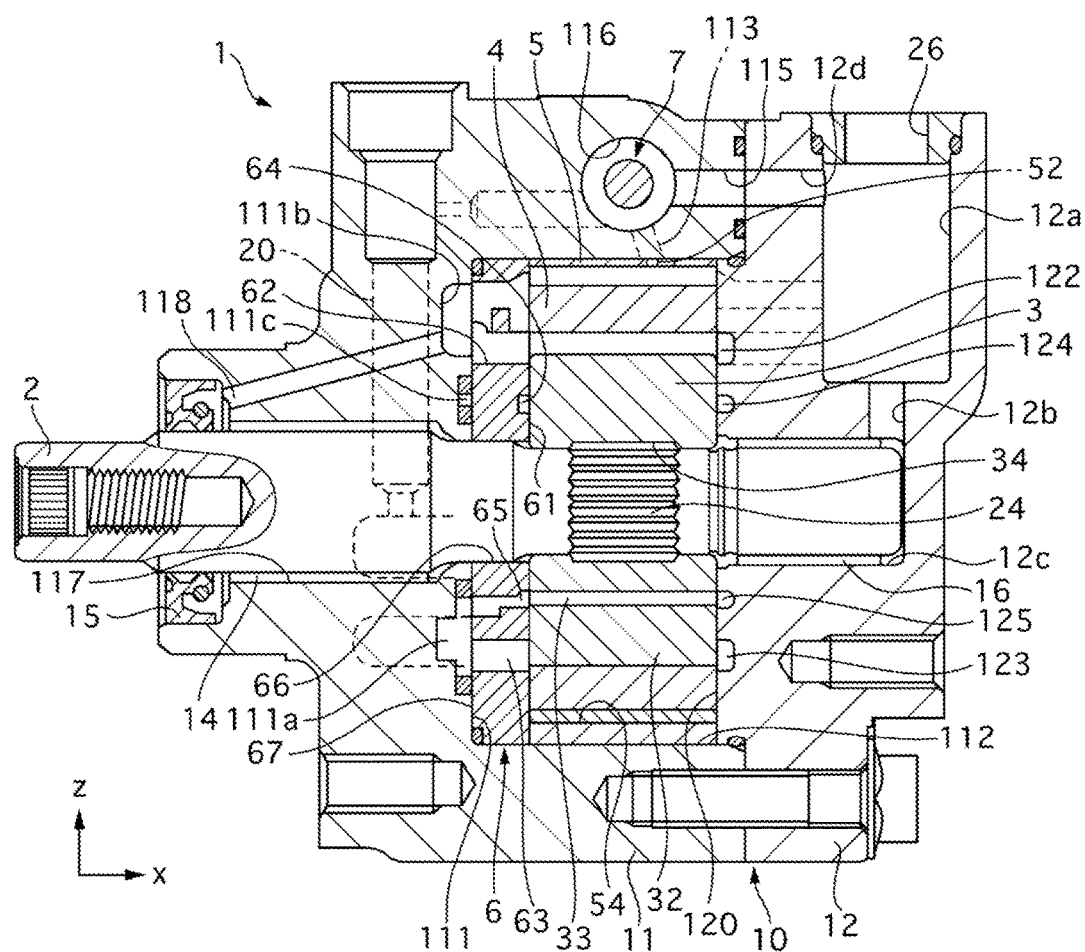
FIG. 2 is an axial sectional view of a variable displacement vane pump of Embodiment 1.
Figure 3:
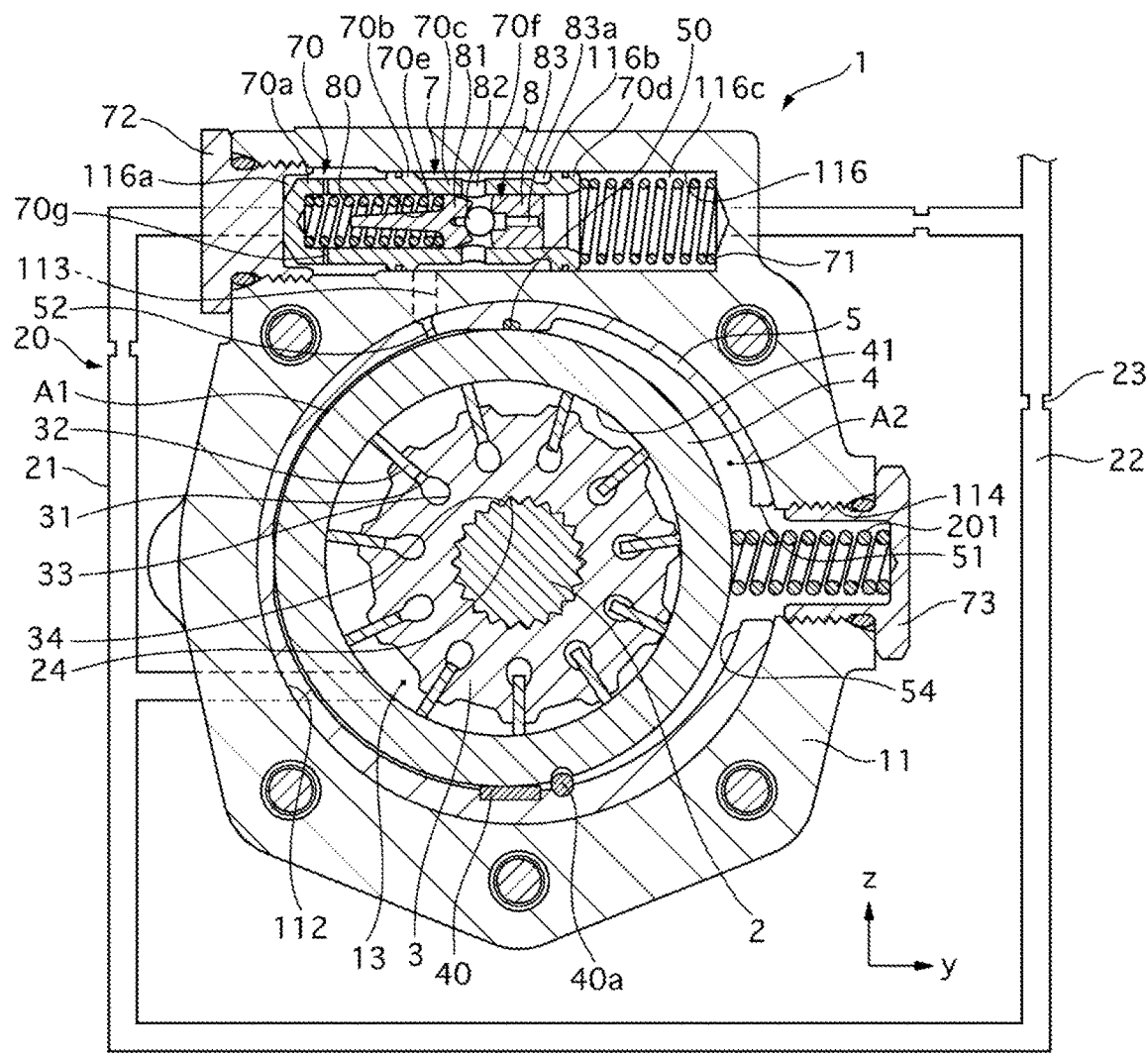
FIG. 3 is a radial sectional view of the variable displacement pump of Embodiment 1.

FIG. 2 is an axial sectional view (a sectional view resulting from cutting FIG. 3 along an axial direction) of the variable displacement vane pump 1 of Embodiment 1, and FIG. 3 is a radial sectional view (a sectional view resulting from cutting FIG. 2 along a radial direction) of the variable displacement vane pump 1. FIG. 3 shows a state in which a cam ring 4 is displaced farthest in a y axis negative direction (a maximum eccentric amount or eccentricity).

A drive shaft 2 of the variable displacement vane pump 1 of Embodiment 1 is connected to a pulley (not shown) which is driven by an engine, out of the figure, via a belt. The sectional view of FIG. 3 shows schematically the configuration of fluid lines to make a simple description of the function of the pump. An axial direction of the drive shaft 2 is referred to as an x axis and a direction in which the drive shaft is inserted into a pump body 10 is referred to as a positive direction. A direction which is an axial direction of a cam spring 201 (refer to FIG. 3) which restricts the oscillation or swing of the cam ring 4 and in which the cam ring 4 is biased is referred to as a y axis negative direction, and an axis which is perpendicular to the x and y axes and which is directed towards a suction line 26 is referred to as a z axis positive direction. The vane pump 1 of Embodiment 1 raises the pressure of a hydraulic fluid which is sucked from the reservoir tank 25 by way of the suction line 26 to a necessary pressure and supplies a required flow rate of hydraulic fluid so pressurized to the power steering system by way of the passage 22 in an ensured fashion.

The variable displacement vane pump 1 includes the drive shaft 2, a rotor 3, the cam ring 4, an adapter ring 5 and the pump body 10. The drive shaft 2 is supported rotatably on the pump body 10. The pulley (not shown) is connected to an end portion of the drive shaft 2 in the x axis negative direction. A serration 24 is formed in a portion of the drive shaft 2 where the rotor is provided. Additionally, a serration 34 is also formed on an inner circumferential surface of the rotor 3. A rotational driving force of the drive shaft 2 is transferred to the rotor 3 by fitting the serration 24 on the drive shaft 2 and the serration 34 on the rotor 3 together. An axial length of the serration 24 on the drive shaft 2 is shorter than an axial length of the rotor 3 (refer to FIG. 2). A plurality of slits 31, which are axial grooves, are formed in a radial direction. Plate-shaped vanes 32 having substantially the same length in the x axis direction as that of the rotor 3 are inserted individually in the slits 31 so as to reciprocate therein in the radial direction. Additionally, back pressure chambers 33 are provided at radially inward end portions of the slits 31. The hydraulic fluid is supplied to the back pressure chambers 33 to thereby bias the vanes 32 radially outwards.

The pump body 10 includes a front body 11 and a rear body 12. The front body 11 has a bottomed cup-like shape and opens to the x axis positive direction side. A cylindrical pump element accommodating portion 112 is formed in an interior portion of the front body 11. An x axis negative direction side of the pump element accommodating portion 112 is closed by a bottom portion 111. A circular disc-shaped pressure plate 6 is accommodated in the bottom portion 111. The front body 11 and the rear body 12 are fixedly fastened together with a plurality of bolts. The adapter ring 5, the cam ring 4 and the rotor 3 are accommodated on an x axis positive direction side of the pressure plate 6 in the pump element accommodating portion 112. The rear body 12 is brought into fluid-tight abutment with the adapter ring 5, the cam ring 4 and the rotor 3 from the x axis positive direction side. The adapter ring 5, the cam ring 4 and the rotor 3 are held by the pressure plate 6 and the rear body 12 therebetween.

The adapter ring 5 is provided in the pump element accommodating portion 112 which constitutes a cylindrical portion. The adapter ring 5 constitutes an annular member in an interior of which a cam ring accommodating portion 54 is formed. As to the shape of the adapter ring 5, the adapter ring 5 should include at least an arc-shaped portion so that an accommodating space is formed in an interior thereof. Thus, the shape of the adapter ring 5 is not limited to the ring-like shape, and hence, the adapter ring 5 may be formed into a C-like shape. A radial through hole 51 is formed in a y axis positive direction side end portion of the adapter ring 5. A plug member insertion hole 114 is provided in a y axis positive direction side end portion of the front body 11. A bottomed cup-shaped plug member 73 is thread fitted in the plug member insertion hole 114, whereby fluid tightness is ensured between an interior and an exterior of the front body 11. The cam spring 201 is inserted in an inner circumference of the plug member 73 so as to extend and contract in a y axis direction. The cam spring 201 extends through or penetrates the radial through hole 51 in the adapter ring 5 to be brought into abutment with the cam ring 4 to thereby bias the cam ring 4 in a y axis negative direction. The cam spring 201 biases the cam ring 4 in a direction in which an oscillation or swing amount thereof becomes the largest so as to stabilize a discharge flow rate of hydraulic fluid (a cam ring oscillating or swinging position) at the start of the pump where the pressure unstable.

The cam ring 4 is accommodated in the cam ring accommodating portion 54 of the adapter ring 5. Distal ends of the vanes 32 are brought into abutment with an inner circumferential surface of the cam ring 4 (a cam ring inner circumferential surface 41). The vanes 32 rotates in such a state that the distal ends of the vanes 32 are in abutment with the cam ring inner circumferential surface 41. A plurality of pump chambers 13 are defined by the cam ring inner circumferential surface 41, the rotor 3 and the vanes 32. The cam ring 4 is provided in the cam ring accommodating portion 54 of the adapter ring 5 so as to move relative to the drive shaft 2.

A pin 40a is provided between the adaptor ring 5 and the cam ring 4. The pin 40a is fixed to the pressure plate 5 and the rear body 12. This pin 40a restricts the position of the adapter ring 5 in a rotational direction relative to the rear body 12 and prevents the cam ring 4 from rotating on its own axis relative to the adapter ring 5 when the pump is driven.

A seal member 50 is provided at an end portion of the cam ring accommodating portion 54 in the z axis positive direction. A supporting surface N is formed at an end portion of the cam ring accommodating portion 54 in a z axis negative direction. A supporting plate 40 is provided on the supporting surface N. The cam ring 4 can roll on the supporting plate 40 and is capable of performing rocking movement in the y axis direction. A first fluid pressure chamber A1 and a second fluid pressure chamber A2 are separately formed between the cam ring 4 and the adapter ring 5 by the supporting plate 40 and the seal member 50.

The first fluid pressure chamber A1 is provided on an outer circumferential side of the cam ring 4 in the cam ring accommodating portion 54 and formed on a side where an interior volume thereof decreases when the cam ring 4 moves in a direction in which the displacements of the plurality of pump chambers 13 increase.

The second fluid pressure chamber A2 is provided on the outer circumferential side of the cam ring 4 in the cam ring accommodating portion 54 and formed on a side where an interior volume thereof increases when the cam ring 4 moves in the direction in which the displacements of the plurality of pump chambers 13 increase.

A through hole 52 is provided on a z axis positive direction side of the adapter ring 5 and on a y axis negative direction side of the seal member 50. This through hole 52 communicates with a spool 70 via a cam control pressure induction line 113 which is provided in the front body 11 so as to connect the first fluid pressure chamber A1 which lies on the y axis negative direction side with the spool 70.

[Configuration of Front Body]

A rotational supporting portion 117, which supports rotatably the drive shaft 2, is formed in the front body 11. This rotational supporting portion 117 is formed in the bottom portion 111 so as to extends through or penetrate it. A first bush 14 (a sliding bearing) which is cylindrical is provided between the rotational supporting portion 117 and the drive shaft 2. An oil seal 15 is provided at a pulley 9 side end portion of the rotational supporting portion 117, and this oil seal 15 ensures fluid tightness in the pump. The front body 11 has, on a z axis positive direction side thereof, a control valve accommodating hole 116 which accommodates the spool 70 which is a pressure control device for controlling an eccentric amount or eccentricity of the cam ring 4 by controlling the pressure within the first fluid pressure chamber A1, a control valve fluid suction line 115 which introduces a hydraulic fluid from the suction line 26 into the spool 70, and cam control pressure induction line 113 which discharges a control pressure into the first fluid pressure chamber A1.

Additionally, the front body 11 has in the bottom portion 111 a suction groove 111b which is formed to be depressed in a position which faces a second suction port 62 of the pressure plate 6, which will be described, a discharge groove 111a which is formed to be depressed in a position which faces a second discharge port 63, a discharge pressure induction groove 111c which faces a surface of a side of a suction side back pressure groove 64 in the z axis negative direction, and a discharge line 20 which is connected to the discharge groove 111a to feed the hydraulic fluid to the power steering system. A suction pressure is applied to the suction groove 111b, and a discharge pressure is applied to the discharge groove 111a and the discharge pressure induction groove 111c. A lubrication line 118 is bored in the suction groove 111b obliquely relative to the x axis so as to supply the hydraulic fluid between the first bush 14 and the drive shaft 2 to lubricate there.

[Configuration of Pressure Plate]

The pressure plate 6 is provided in the pump element accommodating portion 112 which is cylindrical and is disposed between the adapter ring 5 and the bottom portion 111. The pressure plate 6 has an abutment surface 61 which is brought into abutment with an axial end face of the adapter ring 5 and a through hole 66 which is a hole portion through which the drive shaft 2 can extend and which is formed so as to move in an axial direction relative to the drive shaft 2.

The second suction port 62 which is disposed into an arc-like shape on the z axis positive direction side, the second discharge port 63 which is formed into an arc-like shape on the z axis negative direction side, and the suction side back pressure groove 64 and a discharge side back pressure groove 65 which introduce a discharge pressure into the back pressure chambers 33 are formed on the abutment surface 61 of the back pressure 6.

The second suction port 62 is disposed so as to face an axial end face of the cam ring 4 and is formed to open to a suction area where the displacements of the plurality of pump chambers 13 increase as the drive shaft 2 rotates.

The second discharge port 63 is also disposed so as to face the axial end face of the cam ring 4 and is formed to open to a discharge area where the displacements of the plurality of pump chambers 13 decrease as the drive shaft 2 rotates.

Discharge pressures from the discharge groove 111a and the discharge pressure induction groove 111c are applied to an x axis negative direction side surface 67 of the pressure plate 6, whereby the pressure plate 6 is biased towards the adapter ring 5.

[Configuration of Rear Body]

A suction line 12a is formed in the z axis direction in the rear body 12 to introduce the hydraulic fluid from the reservoir tank 25 into a first suction port 122. A fluid line 12d is formed on a z axis positive direction side of the suction line 12a to supply the hydraulic fluid to a fluid line 12 to the spool 70. A bottomed rotational supporting portion 12c which supports the drive shaft 2 rotatably is formed substantially at a central portion of the rear body 12. A second bush 16 to sliding bearing) which is cylindrical is provided between the rotational supporting portion 12c and the drive shaft 2. A lubrication line 12b is formed in a lower end of the suction line 12a and this lubrication line 12b communicates with the rotational supporting portion 12c to supply the hydraulic fluid to a gap defined between the second bush 16 and the drive shaft 2 for lubrication.

The rear body 12 has a pump forming surface 120 which rises into a circular shape on an x axis negative direction side thereof. The first suction port 122 is formed in the pump forming surface 120. This first suction port 122 is disposed to face a surface of a side of the cam ring 4 which lies to face the x axis positive direction and opens to the suction area. Additionally, a first discharge port 123 is formed in the pump forming surface 120. This first discharge port 123 is disposed to face the surface of the side of the cam ring 4 which lies to face the x axis positive direction and opens to the discharge area. Additionally, a suction side back pressure groove 124 and a discharge side back pressure groove 125 are formed on the pump forming surface 120, and the suction side back pressure groove 124 and the discharge side back pressure groove 125 introduce a discharge pressure to the back pressure chambers 33.

[Configuration of Control Unit]

A control unit of the variable displacement vane pump 1 includes the first fluid pressure chamber A1, the second fluid pressure chamber A2, a control valve 7 and the discharge line 20.

The discharge line 20 is a passage which connects various portions in the pump body 10. The control valve accommodating hole 116 which is substantially cylindrical is formed in the front body 11 so as to extend in the direction of the y axis, and the control valve 7 is accommodated in the control valve accommodating hole 116.

The control valve 7 controls or changes the supply and the supply stop of hydraulic fluid to the first fluid pressure chamber A1 by changing the position of the spool 70. In a state shown in FIG. 3, the cam control pressure induction line 113 communicates with a low pressure chamber 116b, and a suction pressure is applied to the first hydraulic pressure chamber A1.

Figure 4:
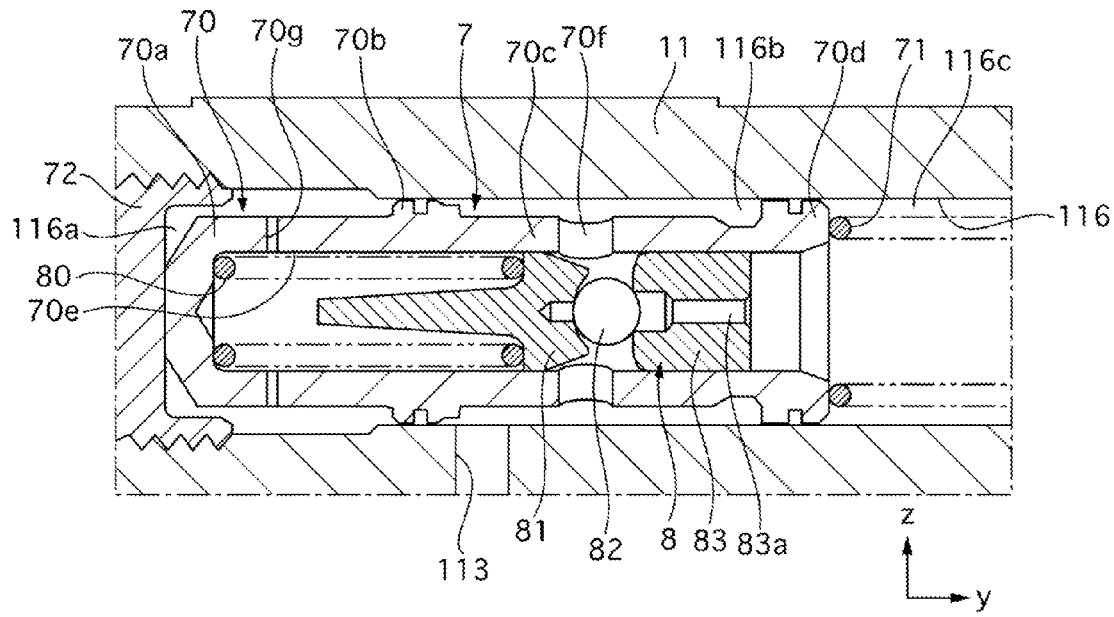
FIG. 4 is an enlarged sectional view of a portion of the variable displacement vane pump where a control valve is provided.

FIG. 4 is an enlarged sectional view of a portion where the control valve 7 is provided. A valve spring 71 is disposed in a compressed state on a y axis positive direction side of the spool 70, and this valve spring 71 biases the spool 70 towards the y axis negative direction at all times. A plug member 72 is screwed into a y axis negative direction side of the spool 70 to close an opening portion of the control valve accommodating hole 116.

In the spool 70, as viewed from the y axis negative direction side, a first small-diameter portion 70a, a first land portion 70b, a second small-diameter portion 70c, and a second land 70d are formed sequentially in that order. Outside diameters of the first land portion 70b and the second land portion 70d are formed so as to be almost the same as a bore diameter of the control valve accommodating hole 116. Additionally, outside diameters of the first small-diameter portion 70a and the second small-diameter portion 70c are formed so as to be smaller than the bore diameter of the control valve accommodating hole 116.

A high pressure chamber 116a is formed in the control valve accommodating hole 116 by a space surrounded by an inner circumference of the control valve accommodating hole 116, an outer circumference of the first small-diameter portion 70a, the plug member 72 and the first land portion 70b.

The low pressure chamber 116b is formed in the control valve accommodating hole 116 by a space surrounded by an inner circumference of the control valve accommodating hole 116, an outer circumference of the second small-diameter portion 70c, the first land portion 70b and the second land portion 70d.

A middle pressure chamber 116c is formed in the control valve accommodating hole 116 by the inner circumference and a y axis positive direction side end face of the control valve accommodating hole 116, and the second land 70d.

Both the high pressure chamber 116a and the middle pressure chamber 116c communicate with the discharge line 20. The discharge line 20 communicates with the discharge groove 111a. The discharge line 20 branches into a passage 21 and the passage 22.

The hydraulic fluid discharged from the second discharge port 63 flows sequentially through the discharge groove 11a, the discharge line 20, the passage 21 and the passage 22 in that order. In FIG. 3, while the discharge line 20 is shown schematically, an actual configuration of the discharge line 20 in the pump is shown in FIG. 2. In FIG. 2, the discharge groove 111a communicates with the discharge line 20 which extends upwards in the figure. The discharge line 20 extends directly upwards as it does to an opening in an upper surface of a pump housing. The discharge line 20 branches off towards the control valve 7 which is disposed to the right of the discharge line 20 in the figure just before the upper opening in the upper surface of the pump housing. This is the branching of the discharge line 20 into the passage 21 and the passage 22 shown in FIG. 3. Namely, a portion of the discharge line 20 which extends upwards as it does from the branching point in the figure constitutes the passage 22, and a portion which extends rightwards from the branching point in the figure constitutes the passage 21.

The passage 21 connects to the high pressure chamber 116a and the passage 22 connects to the middle chamber 116c and the rotary valve 99. A metering orifice 23 is provided halfway in the passage 22. As the discharge flow rate of the variable displacement vane pump 1 is increased more by the metering orifice 23, a pressure difference between before and after the metering orifice 23 becomes larger. Namely, as the discharge flow rate increases more, the pressure in the middle pressure chamber 116c relative to the pressure in the high pressure chamber 116a becomes lower. The low pressure chamber 116b connects to the suction line 26 via the control valve fluid suction line 115. Namely, a suction pressure is applied to the low pressure chamber 116b.

A relief valve accommodating hole 70e is formed in the interior of the spool 70, and this relief valve accommodating hole 70e opens to the y axis positive direction side. A relief valve 8 is accommodated in the relief valve accommodating hole 70e. A ball plug 82, which will be described later, opens when the pressure in the middle pressure chamber 116c increases to high, and this allows the relief valve 8 to communicate with the middle pressure chamber 116c and the low pressure chamber 116b.

The relief valve 8 includes sequentially the valve spring 80, a spring holding member 81, the ball plug 82, and a seat member 83 in that order as viewed from the y axis negative direction side. A through hole 83a is formed in the seat member 83 so as to extend through or penetrate the seat member 83. The seat member 83 is press fitted in the relief valve accommodating hole 70e.

The valve spring 80 is provided between a y axis negative direction side bottom surface of the relief valve accommodating hole 70e and the spring holding member 81 in a compressed state. The valve spring 80 biases the ball plug 82 in the direction of the seat member 83 via the spring holding member 81.

A low pressure chamber communication hole 70f is formed in the spool 70 so as to extend through or penetrate the small-diameter portion 70c in the radial direction. Namely, a portion of the relief valve accommodating hole 70e which is provided to the y axis negative direction side with respect to the ball plug 82 communicates with the low pressure chamber 116b, and a suction pressure is applied to the portion. A clearance exists between the spring holding member 81 and the relief valve accommodating hole 70e, and in the relief valve accommodating hole 70e, a pressure in a space around the ball plug 82 and a pressure in a space where the valve spring 80 is accommodated are almost the same (the suction pressure). Consequently, a high pressure in the high pressure chamber 116a leaks at all times into the space where the valve spring 80 is accommodated via a bypass line 70g.

When the pressure in the middle pressure chamber 116c becomes too high, the ball spring 82 and the spring holding member 81 are pushed towards the y axis negative direction side against the biasing force of the valve spring 80, and the hydraulic fluid in the middle pressure chamber 116c flows into the low pressure chamber 116b via the through hole 83a and the low pressure chamber communication hole 70f, whereby the discharge pressure in the discharge line 20 which connects to the middle pressure line 116c is prevented from becoming too high. In this way, the pump, the power steering system to which the discharge pressure is supplied, and the piping which connects the pump with the power steering system are prevented from being damaged as a result of the discharge pressure becoming too high.

A bypass line 70g is formed in the first small-diameter portion 70a so as to extend through or penetrate the first small-diameter portion 70a in the radial direction. This bypass line 70g is formed far smaller in diameter than the low pressure chamber communication hole 70f. Although an interior of the relief valve accommodating hole 70e communicates with the high pressure chamber 116a, the interior of the relief valve accommodating hole 70e also communicates with the how pressure chamber 16b, and therefore, the interior of the relief valve accommodating hole 70e is held to almost the suction pressure. On the other hand, although the pressure inside the high pressure chamber 116a decreases slightly lower than the discharge pressure, since the bypass line 70g is formed far smaller in diameter than the low pressure chamber communication hole 70f, a pressure which is sufficiently higher than the suction pressure is applied to the high pressure chamber 116a.

[Function]
(Supply of Hydraulic Fluid to First and Second Fluid Pressure Chambers)

Next, a function in relation to the supply of hydraulic fluid will be described.

The larger the discharge flow rate of the variable displacement vane pump 1, the larger the pressure difference between the high pressure change 116a and the middle pressure chamber 116c. The position of the spool 70 is controlled by this pressure difference and the biasing force of the valve spring 71 which is provided at a y axis positive direction side of the spool 70 to thereby generate a control pressure.

Specifically, when the discharge flow rate of the variable displacement vane pump 1 is small, the pressure difference between the high pressure chamber 116a and the middle pressure chamber 116c is small. Because of this, a biasing force in the y axis positive direction which the spool 70 receives from the pressure in the high pressure chamber 116a is smaller than a biasing force in the y axis negative direction which the spool 70 receives from the pressure in the middle pressure chamber 116c and the valve spring 71. This moves the spool 70 in the y axis negative direction (the spool 70 is located in a position shown in FIG. 3). As this occurs, the first fluid pressure chamber A1 communicates with the low pressure chamber 116b via the through hole 52 and the cam control pressure induction line 113, whereby the suction pressure is induced into the first fluid pressure chamber A1 from the low pressure chamber 116b as a control pressure.

As the discharge flow rate of the variable displacement vane pump 1 increases, the pressure difference between the high pressure chamber 116a and the middle pressure chamber 116c is increased by the metering orifice 23. Because of this, the biasing force in the y axis positive direction which the spool 70 receives from the pressure in the high pressure chamber 116a is larger than a biasing force in the y axis negative direction which the spool 70 receives from the pressure in the middle pressure chamber 116c and the valve spring 71. This starts to move the spool 70 in the y axis positive direction. As the spool 70 moves in the y axis positive direction, an opening area of the cam control pressure induction line 113 which opens to the low pressure chamber 116b is reduced gradually by the first land portion 70b, whereas an opening area of the cam control pressure induction line 113 which opens to the high pressure chamber 116a is increased gradually. Lastly, the communication between the low pressure chamber 116b and the cam control pressure induction line 113 is cut off, and the communication between the high pressure chamber 116a and the cam control pressure induction line 113 is connected. As this occurs, the discharge pressure is induced into the first hydraulic fluid pressure chamber A1 as a control pressure. When the can control pressure induction line 113 opens both to the high pressure chamber 116a and the low pressure chamber 116b, a pressure which is adjusted according to a ratio of the opening area of the opening which opens to the high pressure chamber 116a to the opening area of the opening which opens to the low pressure chamber 116b is induced into the first fluid pressure chamber A1 as a control pressure.

As has been described above, the control pressure according to the position of the spool 70 is induced into the first fluid pressure chamber A1. On the other hand, the second fluid pressure chamber A2 communicates with the second suction port 62 and the first suction port 122, and hence, the suction pressure is induced into the second fluid pressure chamber A2. Consequently, the variable displacement vane pump 1 is controlled only by a pressure P1 of the first fluid pressure chamber A1. A pressure P2 of the second fluid pressure chamber A2 is not controlled and the pressure P2=the suction pressure at all times, and therefore, it is possible for the second fluid pressure chamber A2 to obtain a stable pressure, thereby making it possible to execute the control of oscillation or swing of the cam ring 4 by preventing the occurrence of pressure disturbance.

(Eccentric Operation of Cam Ring)

In a fixed displacement vane pump, the discharge flow rate is not stabilized at low engine speeds immediately after an engine is started, and hence, there may be a case where a sufficient assisting force cannot be imparted to the power steering system. On the other hand, the discharge flow rate increases excessively at high engine speeds, and much hydraulic fluid is discharged to the reservoir tank 25 by the rotary valve 99, whereby the load of the engine is wasted accordingly.

With the variable displacement vane pump 1 of Embodiment 1, when the engine speed is low, the eccentricity of the cam ring 4 relative to the rotor 3 is increased so as to increase the flow rate per one rotation of the rotor 3, so that the discharge flow rate of hydraulic fluid is stabilized early. Additionally, as the engine speed increases, the eccentricity of the cam ring 4 relative to the rotor 3 is reduced so as to decrease the discharge flow rate per one rotation of the rotor 3, so that the discharge flow rate of hydraulic fluid is maintained constant.

As has been described above, when the discharge flow rate of the variable displacement vane valve 1 is small, the suction pressure is induced from the low pressure chamber 116b into the first fluid pressure chamber A1 via the through hole 52 and the cam control pressure induction line 113 as a control pressure. As this occurs, a biasing force in the y axis positive direction which the cam ring 4 receives from the pressure P1 in the first fluid pressure chamber A1 is smaller than a sum of the fluid pressure P2 in the second fluid pressure chamber A2 and the biasing force in the y axis negative direction which the cam ring 4 receives from the cam spring 201. Because of this, the cam ring 4 is positioned on the y axis negative direction side, which increases the eccentricity thereof relative to the rotor 3 (refer to FIG. 3).

In addition, as the discharge flow rate of the variable displacement vane pump 1 increases, the discharge pressure or a pressure to which the discharge pressure and the suction pressure are adjusted is induced into the first fluid pressure chamber A1 as a control pressure. As this occurs, a biasing force in the y axis positive direction which the cam ring 4 receives from the pressure P1 in the first fluid pressure chamber A1 is larger than the sum of the fluid pressure P2 in the second fluid pressure chamber A2 and the biasing force in the y axis negative direction which the cam ring 4 receives from the cam spring 201. Because of this, the cam ring 4 moves to the y axis positive direction side, which decreases the eccentricity thereof to the rotor 3.

(Increase in Discharge Flow Rate when Steering Wheel is Turned)

No assisting force is required when the steering wheel 91 is not operated (turned), and the hydraulic fluid discharged from the variable displacement vane pump 1 is discharged into the reservoir tank 25. On the other hand, when the steering wheel 91 is operated (turned), an assisting force is necessary, and hence, the hydraulic fluid discharged from the variable displacement vane pump 1 is supplied to the power cylinder 94. Namely, it is desirable that the discharge flow rate becomes small since most of the hydraulic fluid discharged is discharged when the steering wheel 91 is not turned, whereas it is desirable that the discharge flow rate becomes large since the assisting force is necessary when the steering wheel 91 is turned.

In the conventional variable displacement vane pump, however, whether the steering wheel 91 is turned or not turned, the discharge flow rate is determined based on the engine speeds and the eccentricity of the cam ring 4.

Then, in Embodiment 1, the discharge flow rate of the variable displacement vane pump 1 is made variable according to whether the steering wheel 91 is turned or not turned. Specifically, the bypass line 70g is formed in the spool 70 to perform the bypass of the hydraulic fluid from the high pressure chamber 116a to the low pressure chamber 116b.

When the steering wheel 91 is not turned, the passage 22 of the variable displacement vane pump 1 is connected to the reservoir tank 25.

When the steering wheel 91 is turned, the passage 22 of the variable displacement vane pump 1 is connected to the power cylinder 94. Because of this, the discharge pressure resulting when the steering wheel 91 is turned increases higher than when the steering wheel 91 is not turned. Namely, a pressure on a downstream side of the metering orifice 23 in the passage 22 which connects to the rotary valve 99 (between the metering orifice 23 and the rotary valve 99) is increased. Consequently, the pressure in the middle pressure chamber 116c which communicates with the downstream side of the metering orifice 23 in the passage 22 is also increased. Further, a pressure on an upstream side of the metering orifice 23, that is, the pressures in the passage 21 which communicates with the passage 22 and the high pressure chamber 116a are also increased.

When the pressure in the high pressure chamber 116a increases, the pressure in the middle pressure chamber 116c also increases, and therefore, the difference in pressure between the high pressure chamber 116a and the middle pressure chamber 116c remain the same. Because of this, when the pressure in the high pressure chamber 116a increases, the spool 70 remains stationary, keeping the current position thereof transiently, whereby the flow rate of hydraulic fluid which flows from the high pressure chamber 116a to the low pressure chamber 116b by way of the bypass line 70g (a bypass flow rate) is increases. More specifically, the hydraulic fluid in the high pressure chamber 116a flows into the relief valve accommodating hole 70e by way of the bypass line 70g and flows further from the relief valve accommodating hole 70e into the low pressure chamber 116b by way of between an internal surface of the spool 70 and the ring holding member 81 and the low pressure communication hole 70f.

In this way, when the bypass flow rate increases, the pressure in the high pressure chamber 116a decreases, whereby the pressure difference between the high pressure chamber 116a and the middle pressure chamber 116c decreases. This moves the spool 70 in the y axis negative direction side. The force by which the spool is moved in the y axis negative direction side is made up of not only the pressure in the middle pressure chamber 116c but also the spring force of the valve spring 71. The spool 70 is controlled based on the balance among the pressure in the high pressure chamber 116a, the pressure in the middle pressure chamber 116c and the spring force of the valve spring 71. In this embodiment, although the pressure in the high pressure chamber 116a decreases in such a state that the spool 70 moves in the y axis negative direction side, the relationship in relation to the pressure difference between the high pressure chamber 116a and the middle pressure chamber 116c is still maintained, that is, the pressure in the middle pressure chamber 116c is lower than the pressure in the high pressure chamber 116a. Namely, when the pressure difference between the high pressure chamber 116a and the middle pressure chamber 116c decreases to such an extent that "the pressure in the high pressure chamber 116a<the pressure in the middle pressure chamber 116c+the spring force of the valve spring 70," the spool 70 moves to the y axis negative direction.

The suction pressure is induced from the low pressure chamber 116b into the first fluid pressure chamber A1 by way of the cam control pressure induction line 113 and the through hole 52 as a control pressure. This locates the cam ring 4 in the y axis negative direction side, thereby increasing the eccentricity thereof relative to the rotor 3 (refer to FIG. 3). As this occurs, the pressure in the first fluid pressure chamber A1 is discharged towards the low pressure chamber 116b. This increases the discharge flow rate per one rotation of the rotor 3, whereby the discharge flow rate of the variable displacement vane pump 1 is increased although the engine speed remains constant.

Second Embodiment

In Embodiment 2, an opening/closing valve 60 is provided which opens or closes a bypass line 58a. Like reference numerals will be given to like configurations to those of Embodiment 1, and the description thereof will be omitted here.

[Configuration]

Figure 5:
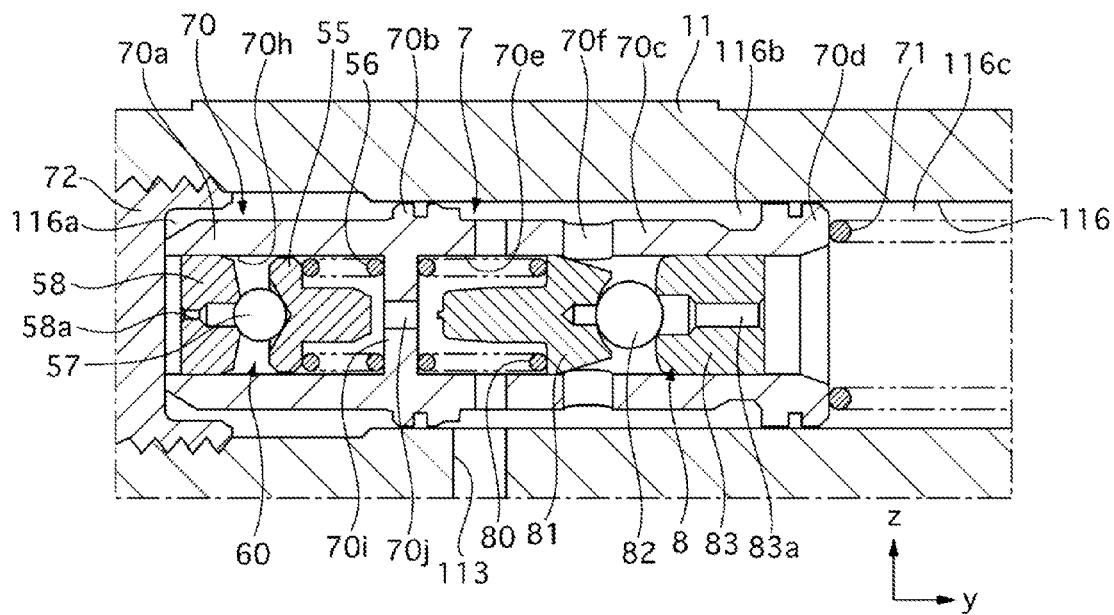
FIG. 5 is an enlarged sectional view of a portion of a variable displacement vane pump of Embodiment 2 of the invention where a control valve is provided.

FIG. 5 is an enlarged sectional view of a portion where a control valve 7 is provided. A relief valve accommodating hole 70e and an opening/closing valve accommodating hole 70h are formed in an interior of a spool 70. The relief valve accommodating hole 70e is formed on a y axis positive direction side of the spool 70, while the opening/closing valve accommodating hole 70h is formed on a y axis negative direction side of the spool 70. A spring seat portion 70i is provided between the relief valve accommodating hole 70e and the opening/closing valve accommodating hole 70h.

A relief valve 8 is accommodated in the relief valve accommodating hole 70e. Similar to Embodiment 1, the relief valve 8 opens when the pressure in a middle pressure chamber 116c increases excessively so as to establish a communication between the middle pressure chamber 116c and a low pressure chamber 116b. In the relief valve 8, as viewed from a y axis negative direction side, a valve spring 80, a spring holding member 81, a ball plug 82 and a seat member 83 are provided in that order.

A through hole 83a is formed in the seat member 83 so as to extend through or penetrate the seat member 83 in an axial direction. The seat member 83 is press fitted in the relief valve accommodating hole 70e.

The valve spring 80 is provided between a spring seat portion 70i and the spring holding member 81 in a compressed state and biases the ball plug 82 in the direction of the seat member 83 via the spring holding member 81.

In the spool 70, a low pressure chamber communication hole 70f is formed in a small-diameter portion 70c thereof so as to establish a communication between the low pressure chamber 116b and the relief valve accommodating hole 70e. This enables a portion of the relief valve accommodating hole 70e which is provided to the y axis negative direction side with respect to the ball plug 82 to communicate with the low pressure chamber 116b, and a suction pressure is applied to the side of the relief valve accommodating hole 70e.

The opening/closing valve 60 is accommodated in the opening/closing valve accommodating hole 70h. The opening/closing valve 60 decreases the pressure in a high pressure chamber 116a by opening the bypass line 58a by moving the ball plug 57 away from the seat member 58 to allow a hydraulic fluid in the high pressure chamber 116a to be released therefrom into the low pressure chamber 116b when the pressure in the high pressure chamber 116a is increased as a result of a steering wheel 91 being turned. Thus, as described in Embodiment 1, the opening/closing valve 60 decreases a difference in pressure between the high pressure chamber 116a and the middle pressure chamber 116c. In the opening/closing valve 60, as viewed from a y axis positive direction side, a valve spring 56, a spring holding member 55, the ball plug 57 and the seat member 58 are provided sequentially in that order.

The bypass line 58a is formed in the seat member 58 so as to extend through or penetrate the seat member 58 in an axial direction. The seat member 58 is press fitted in the opening/closing valve accommodating hole 70h. The valve spring 56 is provided between the spring seat portion 70i and the spring holding member 81 in a compressed state and biases the ball plug 57 in the direction of the seat member 58. The biasing force of the valve spring 56 is set so as to open the opening/closing valve 60 when the difference in pressure between the high pressure chamber 116a and the low pressure chamber 116b becomes a predetermined value or larger. Namely, the opening/closing valve 60 is set so as not to be opened under such circumstances that the pressure in the high pressure chamber 116a is slightly increased as a result of the steering wheel 91 being turned slightly. A communication hole 70j is provided in a central portion of the spring seat portion 70i so as to establish a communication between the relief valve accommodating hole 70e and the opening/closing valve accommodating hole 70h. This allows a portion of the opening/closing valve accommodating hole 70h which is provided to a y axis positive direction side with respect to the ball plug 57 to communicate with the low pressure chamber 116b, and a suction pressure is applied to the side of the opening/closing valve accommodating hole 70e.

[Function]

The pressure in the high pressure chamber 116a and the pressure in the middle pressure chamber 116c are increased when the steering wheel 91 is turned. When the pressure in the high pressure chamber 116a is increased, the opening/closing valve 60 opens, which increases the flow rate of hydraulic fluid which flows into the low pressure chamber 116b by way of the bypass line 58a (the bypass flow rate).

Specifically, when the pressure in the high pressure chamber 116a increases and the opening/closing valve 60 opens, the hydraulic fluid in the high pressure chamber 116a flows into the low pressure chamber 116b by way of the bypass line 58a, between the spring holding member 55 and the internal surface of the first small-diameter portion 70a, the communication hole 70j, the relief valve accommodating hole 70e and a flow path 70x which is provided in the small-diameter portion 70c. Additionally, the hydraulic fluid also flows from the relief valve accommodating hole 70e into the low pressure chamber 116b by way of between the small-diameter portion 70c and the spring holding member 81 and the low pressure chamber communication hole 70f. When the bypass flow rate increases, the pressure in the high pressure chamber 116a decreases, whereby the difference in pressure between the high pressure chamber 116a and the middle pressure chamber 116c decreases as described in Embodiment 1. Because of this, the spool 70 moves in the y axis negative direction, and the suction pressure is induced into the first fluid pressure chamber A1 from the low pressure chamber 116b via a cam control pressure induction line 113 and a through hole 52 as a control pressure. Because of this, the cam ring 4 is positioned on the y axis negative direction side, whereby the eccentricity of the cam ring 4 relative to rotor 3 increases (refer to FIG. 3). Consequently, the discharge flow rate per one rotation of the rotor 3 increases, and although the engine speed remains constant, the discharge flow rate of the variable displacement vane pump 1 increases.

The bypass line 58a is made to communicate only when the steering wheel 91 is turned by providing the opening/closing valve 60, while the communication of the bypass line 58a is cut off when the steering wheel 91 is not turned. Because of this, when the steering wheel 91 is not turned, the cam ring 4 is caused to be decentered or deviate so that the discharge flow rate of the variable displacement vane pump 1 can be decreased, while securing the pressure difference between the high pressure chamber 116a and the middle pressure chamber 116c.

The biasing force of the valve spring 56 is set so that opening/closing valve 60 is not opened under such circumstances that the pressure in the high pressure chamber 116a is slightly increased as a result of the steering wheel 91 being turned slightly. Because of this, when the steering wheel 91 is turned slightly, requiring no increase in the discharge flow rate of the variable displacement vane pump 1, the cam ring 4 is caused to be decentered or deviate so that the discharge flow rate of the variable displacement vane pump 1 can be decreased, while securing the pressure difference between the high pressure chamber 116a and the middle pressure chamber 116c.

Additionally, the opening/closing valve 60 is provided in the spool 70 of the control valve 7. Because of this, it is possible to avoid an increase in size of the variable displacement vane pump 1 even though the opening/closing valve 60 is provided.

Since the ball plug 57 is biased in the direction of the seat member 58 by the valve spring 56, the opening area (the flow path sectional area) of the bypass line 58a becomes larger as the pressure in the high pressure chamber 116a becomes higher. Thus, the discharge flow rate can be increased when the hydraulic fluid is required in a power cylinder 94 due to the load of the power steering system 90 being high.

[Advantage]

(4) The bypass line 58a is made to have further the opening/closing valve 60 which is provided halfway in the bypass line 58a and which opens when the pressure in the portion which is in upstream side of the metering orifice 23 increases.

Consequently, when the steering wheel 91 is not turned, the cam ring 4 is caused to be decentered or deviate so that the discharge flow rate of the variable displacement vane pump 1 can be decreased, while securing the pressure difference between the high pressure chamber 116a and the middle pressure chamber 116c.

(5) The opening/closing valve 60 is set so that the opening/closing valve 60 opens when the pressure applied to the opening/closing valve 60 becomes the predetermined value or larger.

Consequently, when the steering wheel 91 is turned slightly, the cam ring 4 is caused to be decentered or deviate so that the discharge flow rate of the variable displacement vane pump 1 can be decreased, while securing the pressure difference between the high pressure chamber 116a and the middle pressure chamber 116c.

(6) The opening/closing valve 60 is provided in the spool 71 of the control valve 70.

Consequently, it is possible to avoid an increase in size of the variable displacement vane pump 1 even though the opening/closing valve 60 is provided.

The bypass line 58a is provided in the control valve 7 and the flow path sectional area of the bypass line 58a is made to be controlled variably in association with the movement of the opening/closing valve 60.

Consequently, the discharge flow rate can be increased as the load of the power steering system 90 becomes high.

Embodiment 3

In Embodiment 3, a stopper 701 is provided which restricts an opening amount of an opening/closing valve 60. Like reference numerals will be given to like configurations to those of Embodiment 1 or Embodiment 2, and the description thereof will be omitted here.

[Configuration]

Figure 6:
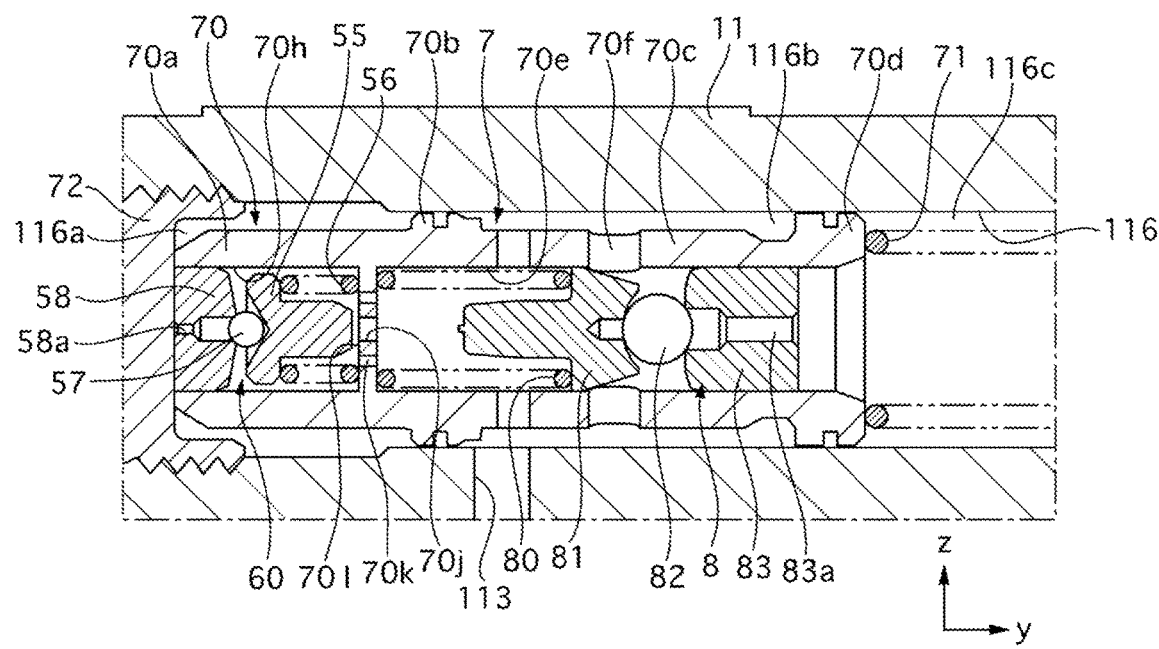
FIG. 6 is an enlarged sectional view of a portion of a variable displacement vane pump of Embodiment 3 where a control valve is provided.

FIG. 6 is an enlarged sectional view of a portion where a control valve 7 is provided. A relief valve accommodating hole 70e and an opening/closing valve accommodating hole 70h are formed in an interior of a spool 70. The relief valve accommodating hole 70e is formed on a y axis positive direction side of the spool 70. The opening/closing valve accommodating hole 70h is formed on a y axis negative direction side of the spool 70. A spring seat portion 70i is provided between the relief valve accommodating hole 70e and the opening/closing valve accommodating hole 70h.

A relief valve 8 is accommodated in the relief valve accommodating hole 70e. The relief valve 8 opens a ball plug 82 when the pressure in a middle pressure chamber 116c increases excessively so as to establish a communication between the middle pressure chamber 116c and a low pressure chamber 116b. In the relief valve 8, as viewed from a y axis negative direction side, a valve spring 80, a spring holding member 81, a ball plug 82 and a seat member 83 are provided in that order.

A through hole 83a is formed in the seat member 83 so as to extend through or penetrate the seat member 83 in an axial direction. The seat member 83 is press fitted in the relief valve accommodating hole 70e. The valve spring 80 is provided between a spring seat portion 70i and the spring holding member 81 in a compressed state and biases the ball plug 82 in the direction of the seat member 83 via the spring holding member 81. In the spool 70, a low pressure chamber communication hole 70f is formed in a small-diameter portion 70c thereof so as to establish a communication between the low pressure chamber 116b and the relief valve accommodating hole 70e. This enables a portion of the relief valve accommodating hole 70e which is provided to the y axis negative direction side with respect to the ball plug 82 to communicate with the low pressure chamber 116b via the low pressure communication hole 70f, and a suction pressure is applied to the side of the relief valve accommodating hole 70e.

The opening/closing valve 60 is accommodated in the opening/closing valve accommodating hole 70h. The opening/closing valve 60 decreases the pressure in a high pressure chamber 116a by opening the bypass line 58a by moving the ball plug 57 away from the seat member 58 to allow a hydraulic fluid in the high pressure chamber 116a to be released therefrom into the low pressure chamber 116b when the pressure in the high pressure chamber 116a is increased as a result of a steering wheel 91 being turned. Thus, the opening/closing valve 60 decreases a difference in pressure between the high pressure chamber 116a and the middle pressure chamber 116c. In the opening/closing valve 60, as viewed from a y axis positive direction side, a valve spring 56, a spring holding member 55, the ball plug 57 and the seat member 58 are provided sequentially in that order.

The bypass line 58a is formed in the seat member 58 so as to extend through or penetrate the seat member 58 in an axial direction. The seat member 58 is press fitted in the opening/closing valve accommodating hole 70h. The valve spring 56 is provided between the spring seat portion 70i and the spring holding member 81 in a compressed state and biases the ball plug 57 in the direction of the seat member 58 via the spring holding member 55. The biasing force of the valve spring 56 is set so as to open the opening/closing valve 60 when the difference in pressure between the high pressure chamber 116a and the low pressure chamber 116b becomes a predetermined value or larger. Namely, the opening/closing valve 60 is set so as not to be opened under such circumstances that the pressure in the high pressure chamber 116a is slightly increased as a result of the steering wheel 91 being turned slightly.

When the opening/closing valve 60 opens, in case the spring holding member 55 moves a predetermined amount in the y axis positive direction, the spring holding member 55 is brought into abutment with the spring seat portion 70i, whereby the opening amount of the opening/closing valve 60 is restricted. Namely, a y axis negative direction side surface of the spring seat portion 70i constitutes a stopper 701. A communication hole 70j is provided in a central portion of the spring seat portion 70i so as to establish a communication between the relief valve accommodating hole 70e and the opening/closing valve accommodating hole 70h. This allows a portion of the opening/closing valve accommodating hole 70h which is provided to the y axis positive direction side with respect to the ball plug 57 to communicate with the low pressure chamber 116b, and a suction pressure is applied to the portion of the opening/closing valve accommodating hole 70h. Additionally, a plurality of auxiliary communication holes 70k are also provided on the periphery of the communication hole 70j so as to establish a communication between the relief valve accommodating hole 70e and the opening/closing valve accommodating hole 70h. The auxiliary communication holes 70k are formed in positions where they are not closed although the spring holding member 55 is brought into abutment with the spring seat portion 70i, thereby ensuring the communication between the opening/closing valve accommodating hole 70h and the low pressure chamber 116b.

[Function]

When the steering wheel 91 is turned, the pressure in the high pressure chamber 116a increases, whereby the opening/closing valve 60 opens, which increases the flow rate (the bypass flow rate) of hydraulic fluid flowing into the low pressure chamber 116b through the bypass line 58a. As the bypass flow rate increases, the pressure in the high pressure chamber 116a decreases, and the pressure difference between the high pressure chamber 116a and the middle pressure chamber 116c decreases. Because of this, the spool 70 moves to the y axis negative direction side, and the suction pressure is induced from the low pressure chamber 116b into a first fluid pressure chamber A1 by way of a cam pressure induction line 113 and a through hole 52 as a control pressure. This positions a cam ring 4 in the y axis negative direction side, thereby increasing the eccentricity of the cam ring 4 relative to a rotor 3 (refer to FIG. 3). Consequently, the discharge flow rate per one rotation of the rotor 3 increases, this increasing the discharge flow rate of the variable displacement vane pump 1 although the engine speed remains constant.

The stopper 701 is provided which restricts the opening amount of the opening/closing valve 60 in the event that the spring holding member 55 moves a predetermined amount in the y axis positive direction when the opening/closing valve 60 opens. The provision of the stopper 701 can saturate the increase in discharge flow rate by preventing the opening/closing valve 60 from opening excessively.

Figure 7:
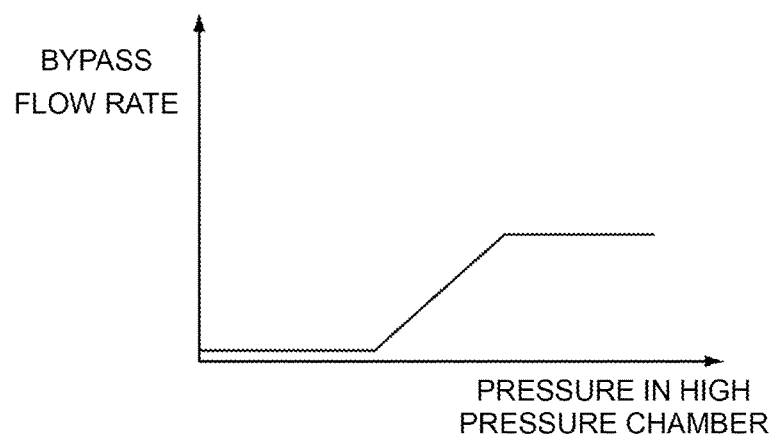
FIG. 7 is a graph showing a relationship between a pressure in a high pressure chamber and a bypass flow rate according to Embodiment 3.

Additionally, the ball plug 57 is biased to the seat member 58 via the spring holding member 55 by the valve spring 56 so as to close the opening/closing valve 60. FIG. 7 is a graph showing a relationship between the pressure in the high pressure chamber 116a and the bypass flow rate. When the pressure in the high pressure chamber 116a is small, the opening/closing valve 60 is closed, and therefore, the bypass flow rate is almost zero. When the pressure in the high pressure chamber 116a reaches a predetermined pressure, the opening/closing valve 60 opens, and as the pressure increases, the opening amount increases, and the bypass flow rate increases. When the pressure in the high pressure chamber 116a exceeds the predetermined pressure, the spring holding member 55 comes into abutment with the stopper 701, whereby the opening amount of the opening/closing valve 60 increases no more, and the bypass flow rate remains constant.

Because of this, when the steering wheel 91 is turned slightly, requiring no increase in the discharge flow rate of the variable displacement vane pump 1, the cam ring 4 is caused to be decentered or deviate so that the discharge flow rate of the variable displacement vane pump 1 can be decreased, while securing the pressure difference between the high pressure chamber 116a and the middle pressure chamber 116c. Additionally, when the steering wheel 91 is turned, too, the discharge flow rate can be prevented from increasing excessively, thereby making it possible to enhance the stability in steering. The system can also be protected.

[Advantage]

(8) The stopper 701 is provided which restricts the opening amount of the opening/closing valve 60.

Consequently, the opening/closing valve 60 can be prevented from opening excessively, thereby making it possible to saturate the increase in discharge flow rate.

(9) The flow rate of hydraulic fluid which passes through the bypass line 58a is made to be held almost constant until the pressure of hydraulic fluid in anyone of the high pressure chamber 116a, the high pressure induction line 113 and a discharge line 20 which lies in an area upstream of a metering orifice 23 reaches the predetermined pressure.

Consequently, when the steering wheel is turned slightly, requiring no increase in the discharge flow rate of the variable displacement vane pump, t the discharge flow rate of the variable displacement vane pump can be decreased.

(10) The flow rate of hydraulic fluid which passes through the bypass line 58a is made to be held almost constant when the pressure of hydraulic fluid in anyone of the high pressure chamber 116a, the high pressure induction line 113 and the discharge line 20 which lies in an area upstream of the metering orifice 23 is the predetermined pressure or larger.

Consequently, the discharge flow rate can be restricted from increasing excessively, thereby making it possible to stabilize the stability in steering. The system can also be protected.

Embodiment 4

In Embodiment 4, a flow path area of a bypass line 58a is made to increase step by step when an opening/closing valve 60 opens. Like reference numerals will be given to like configurations to those of Embodiment 1, Embodiment 2 or Embodiment 3, and the description thereof will be omitted here.

[Configuration]

Figure 8:
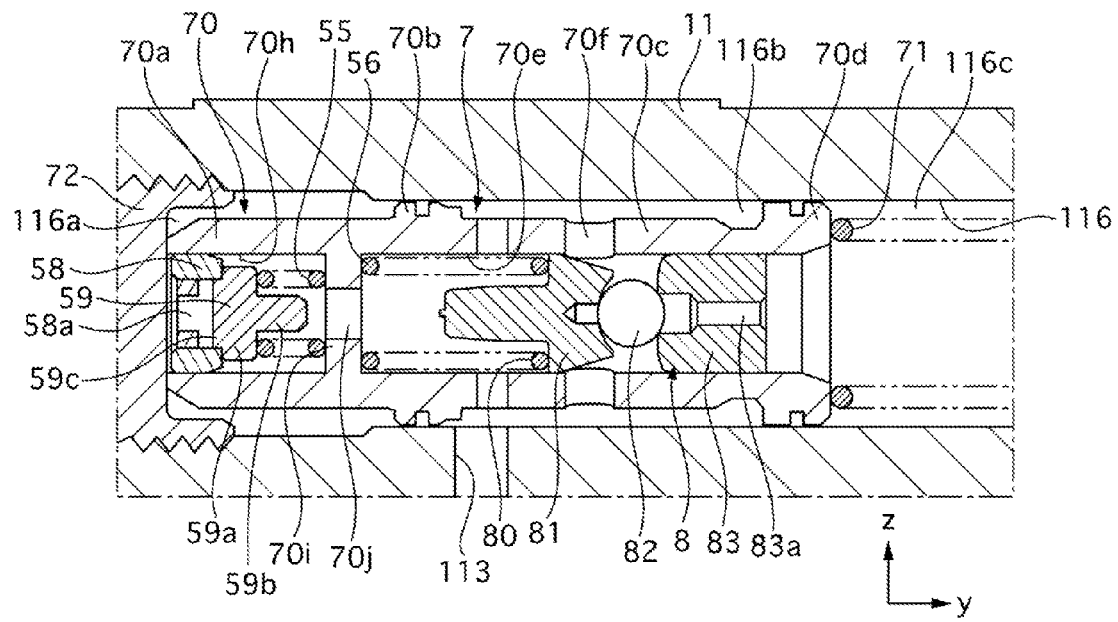
FIG. 8 is an enlarged sectional view of a portion of a variable displacement vane pump of Embodiment 4 of the invention where a control valve is provided.

FIG. 8 is an enlarged sectional view of a portion where a control valve 7 is provided. A relief valve accommodating hole 70e and an opening/closing valve accommodating hole 70h are formed in an interior of a spool 70. The relief valve accommodating hole 70e is formed on a y axis positive direction side of the spool 70, while the opening/closing valve accommodating hole 70h is formed on a y axis negative direction side of the spool 70. A spring seat portion 70i is provided between the relief valve accommodating hole 70e and the opening/closing valve accommodating hole 70h.

A relief valve 8 is accommodated in the relief valve accommodating hole 70e. The relief valve 8 opens when the pressure in a middle pressure chamber 116c increases excessively so as to establish a communication between the middle pressure chamber 116c and a low pressure chamber 116b. In the relief valve 8, as viewed from a y axis negative direction side, a valve spring 80, a spring holding member 81, a ball plug 82 and a seat member 83 are provided in that order.

A through hole 83a is formed in the seat member 83 so as to extend through or penetrate the seat member 83 in an axial direction. The seat member 83 is press fitted in the relief valve accommodating hole 70e. The valve spring 80 is provided between a spring seat portion 70i and the spring holding member 81 in a compressed state and biases the ball plug 82 in the direction of the seat member 83 via the spring holding member 81.

In the spool 70, a low pressure chamber communication hole 70f is formed in a small-diameter portion 70c thereof so as to establish a communication between the low pressure chamber 116b and the relief valve accommodating hole 70e. This enables a portion of the relief valve accommodating hole 70e which is provided to the y axis negative direction side with respect to the ball plug 82 to communicate with the low pressure chamber 116b, and a suction pressure is applied to the side of the relief valve accommodating hole 70e.

The opening/closing valve 60 is accommodated in the opening/closing valve accommodating hole 70h. The opening/closing valve 60 decreases the pressure in a high pressure chamber 116a by opening the opening/closing valve 60 to allow a hydraulic fluid in the high pressure chamber 116a to be released therefrom into the low pressure chamber 116b when the pressure in the high pressure chamber 116a is increased as a result of a steering wheel 91 being turned. Thus, the opening/closing valve 60 decreases a difference in pressure between the high pressure chamber 116a and the middle pressure chamber 116c. In the opening/closing valve 60, as viewed from a y axis positive direction side, a valve spring 56, a valve body 59 and the seat member 58 are provided sequentially in that order.

The bypass line 58a is formed in the seat member 58 so as to extend through or penetrate the seat member 58 in an axial direction. The seat member 58 is press fitted in the opening/closing valve accommodating hole 70h. The valve body 59 has a main body portion 59a, an insertion portion 59c which is provided on a y axis negative direction side, and a spring holding portion 59b which is provided on a y axis positive direction side. The insertion portion 59c is formed smaller in diameter than the main body portion 59a, and the insertion portion 59c is inserted into the bypass line 58a when the opening/closing valve 60 is closed. The valve spring 56 is provided between the spring seat portion 70i and the spring holding portion 59b of the valve body 59 in a compressed state and biases the valve body 59 in the direction of the seat member 58. The biasing force of the valve spring 56 is set so as to open the opening/closing valve 60 when the difference in pressure between the high pressure chamber 116a and the low pressure chamber 116b becomes a predetermined value or larger.

Namely, the opening/closing valve 60 is set so as not to be opened under such circumstances that the pressure in the high pressure chamber 116a is slightly increased as a result of the steering wheel 91 being turned slightly. A communication hole 70j is provided in a central portion of the spring seat portion 70i so as to establish a communication between the relief valve accommodating hole 70e and the opening/closing valve accommodating hole 70h. This allows a portion of the opening/closing valve accommodating hole 70h which is provided to a y axis positive direction side with respect to the valve body 59 to communicate with the low pressure chamber 116b, and a suction pressure is applied to the side of the opening/closing valve accommodating hole 70e.

[Function]

When the steering wheel 91 is turned, the pressure in the high pressure chamber 116a increases, whereby the opening/closing valve 60 opens, which increases the flow rate (the bypass flow rate) of hydraulic fluid flowing into the low pressure chamber 116b through the bypass line 58a. As the bypass flow rate increases, the pressure in the high pressure chamber 116a decreases, and as with the embodiments described above, the pressure difference between the high pressure chamber 116a and the middle pressure chamber 116c decreases. Because of this, the spool 70 moves to the y axis negative direction side, and the suction pressure is induced from the low pressure chamber 116b into a first fluid pressure chamber A1 by way of a cam pressure induction line 113 and a through hole 52 as a control pressure. This positions a cam ring 4 in the y axis negative direction side, thereby increasing the eccentricity of the cam ring 4 relative to a rotor 3 (refer to FIG. 3). Consequently, the discharge flow rate per one rotation of the rotor 3 increases, this increasing the discharge flow rate of the variable displacement vane pump 1 although the engine speed remains constant.

When the opening/closing valve 60 is closed, the insertion portion 59a of the valve body 59 is inserted into the bypass line 58a. Because of this, when the valve body 59 moves in the y axis positive direction, the flow path area of the bypass line 58a increases step by step. This can enhance the response to a change in discharge flow rate which is triggered by a change in pressure in the high pressure chamber 116a.

[Advantage]

(11) The flow path area of the bypass line 58a is made to increase step by step as the valve body 59 moves to the other axial direction.

Consequently, it is possible to enhance the response to a change in discharge flow rate which is triggered by a change in pressure in the high pressure chamber 116a.

Embodiment 5

In Embodiment 5, a flow path area of a bypass line 58a is made to change continuously when an opening/closing valve 60 opens. Like reference numerals will be given to like configurations to those of Embodiments 1 to 4, and the description thereof will be omitted here.

[Configuration]

Figure 9:
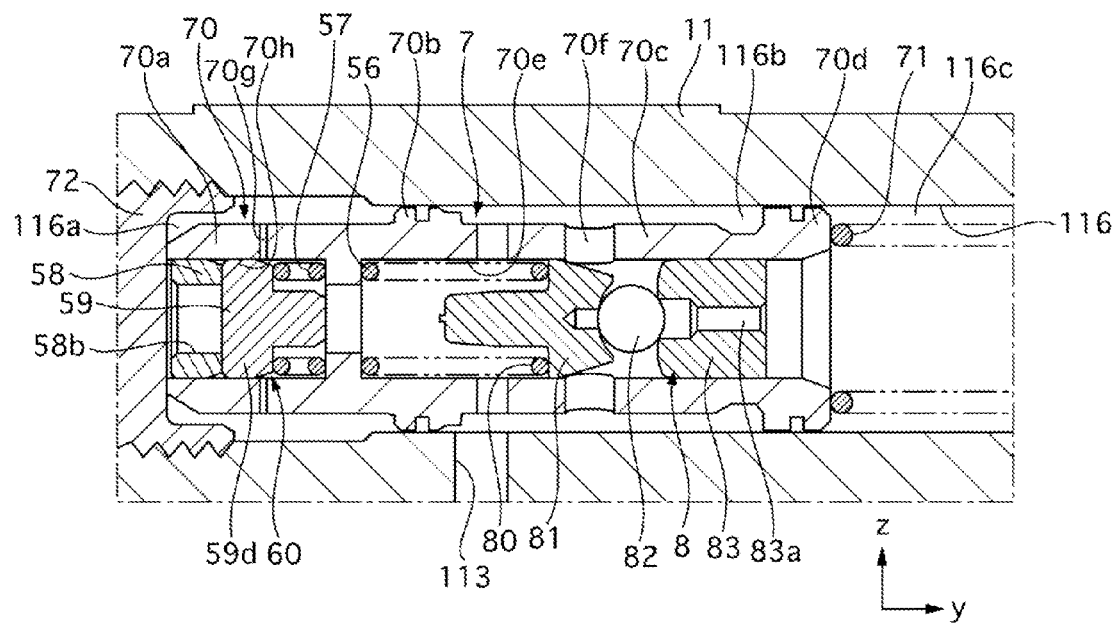
FIG. 9 is an enlarged sectional view of a portion of a variable displacement vane pump of Embodiment 5 of the invention where a control valve is provided.

FIG. 9 is an enlarged sectional view of a portion where a control valve 7 is provided. A relief valve accommodating hole 70e and an opening/closing valve accommodating hole 70h are formed in an interior of a spool 70. The relief valve accommodating hole 70e is formed on a y axis positive direction side of the spool 70, while the opening/closing valve accommodating hole 70h is formed on a y axis negative direction side of the spool 70. A spring seat portion 70i is provided between the relief valve accommodating hole 70e and the opening/closing valve accommodating hole 70h.

A relief valve 8 is accommodated in the relief valve accommodating hole 70e. The relief valve 8 opens when the pressure in a middle pressure chamber 116c increases excessively so as to establish a communication between the middle pressure chamber 116c and a low pressure chamber 116b. In the relief valve 8, as viewed from a y axis negative direction side, a valve spring 80, a spring holding member 81, a ball plug 82 and a seat member 83 are provided in that order.

A through hole 83a is formed in the seat member 83 so as to extend through or penetrate the seat member 83 in an axial direction. The seat member 83 is press fitted in the relief valve accommodating hole 70e. The valve spring 80 is provided between a spring seat portion 70i and the spring holding member 81 in a compressed state and biases the ball plug 82 in the direction of the seat member 83 via the spring holding member 81. In the spool 70, a low pressure chamber communication hole 70f is formed in a small-diameter portion 70c thereof so as to establish a communication between the low pressure chamber 116b and the relief valve accommodating hole 70e. This enables a portion of the relief valve accommodating hole 70e which is provided to the y axis negative direction side with respect to the ball plug 82 to communicate with the low pressure chamber 116b, and a suction pressure is applied to the side of the relief valve accommodating hole 70e.

A bypass line 70g is formed in a first small-diameter portion 70a so as to extend through or penetrate the first small-diameter portion 70a in a radial direction. The bypass line 70g establishes a communication between a high pressure chamber 116a and an interior of the opening/closing valve accommodating hole 70h. An opening/closing valve 60 is accommodated in the opening/closing valve accommodating hole 70h. The opening/closing valve 60 includes, as viewed from a y axis positive direction side, a valve spring 56, a valve body 59 and a seat member 58. A high pressure chamber communication hole 58b is formed in the seat member 58 so as to extend through or penetrate the seat member 58 in an axial direction. The seat member 58 is press fitted in the opening/closing valve accommodating hole 70h.

The valve body 59 is provided slidably in the opening/closing valve accommodating hole 70h. An outside diameter of an outermost portion of a main body portion 59d of the valve body 59 is formed almost the same as a bore diameter of the opening/closing valve accommodating hole 70h. The opening/closing valve accommodating hole 70h is formed separately into a y axis negative direction side accommodating hole and a y axis positive direction side accommodating hole by the valve body 59.

Figure 10:
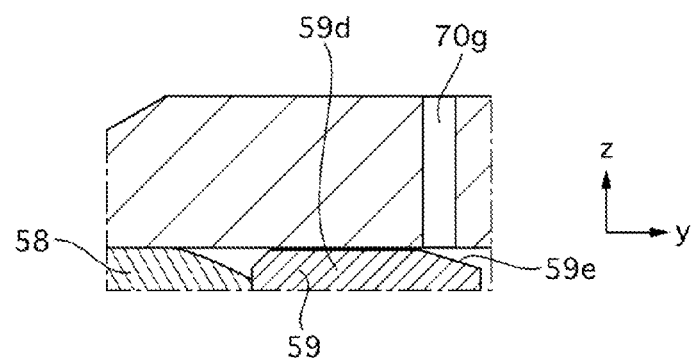
FIG. 10 is an enlarged sectional view of a portion of the variable displacement vane pump of Embodiment 5 where a valve body and a bypass passage are provided.

FIG. 10 is an enlarged sectional view of a portion where the valve body 59 and the bypass line 70g are provided. A tapered portion 59e is formed on a y axis positive direction side of an outer circumferential surface of the valve body 59, and in this tapered portion 59e, an outside diameter of the valve body 59 is gradually decreased as it extends in the y axis positive direction. When the valve body 59 moves in the y axis positive direction, a flow path area of the bypass line 70g is made to gradually decrease in a continuous fashion by the tapered portion 59e.

The valve spring 56 is provided between the spring seat portion 70i and the valve body 59 in the compressed state and biases the ball plug 57 via the spring holding member 55 in the direction of the seat member 58. A communication hole 70j is provided in a central portion of the spring seat portion 70i so as to establish a communication between the relief valve accommodating hole 70e and the opening/closing valve accommodating hole 70h. This allows a portion of the opening/closing accommodating hole 70h which is provided to the y axis positive direction side with respect to the valve body 59 to communicate with the low pressure chamber 116b, and the suction pressure is applied to the y axis positive direction side of the opening/closing valve accommodating hole 70h.

[Function]
When the pressure in the high pressure chamber 116a increases, the flow rate (the bypass flow rate) of hydraulic fluid flowing from the high pressure chamber 116a into the low pressure chamber 116b through the bypass line 70g is increased. As the bypass flow rate increases, the pressure in the high pressure chamber 116a decreases, and similar to the embodiments described above, the pressure difference between the high pressure chamber 116a and the middle pressure chamber 116c decreases. Because of this, the spool 70 moves to the y axis negative direction side, and the suction pressure is induced from the low pressure chamber 116b into a first fluid pressure chamber A1 by way of a cam pressure induction line 113 and a through hole 52 as a control pressure. This positions a cam ring 4 in the y axis negative direction side, thereby increasing the eccentricity of the cam ring 4 relative to a rotor 3 (refer to FIG. 3). Consequently, the discharge flow rate per one rotation of the rotor 3 increases, this increasing the discharge flow rate of the variable displacement vane pump 1 although the engine speed remains constant.

Additionally, the flow path sectional area of the bypass line 70g is made to decrease continuously as the valve body 59 moves in the y axis negative direction. This can prevent the discharge flow rate from changing too sensitively, thereby making it possible to enhance the stability in steering.

[Advantage]
(12) The flow path sectional area of the bypass line 70g is made to decrease continuously as the valve body 59 moves in the y axis negative direction.

Consequently, it is possible to prevent the discharge flow rate from changing too sensitively, thereby making it possible to enhance the stability in steering.

Embodiment 6

In Embodiment 6, a bypass line 70g is formed at a distal end of a spool 70 in a y axis negative direction. Like reference numerals will be given to like configurations to those of Embodiments 1 to 5, and the description thereof will be omitted here.

Figure 11:
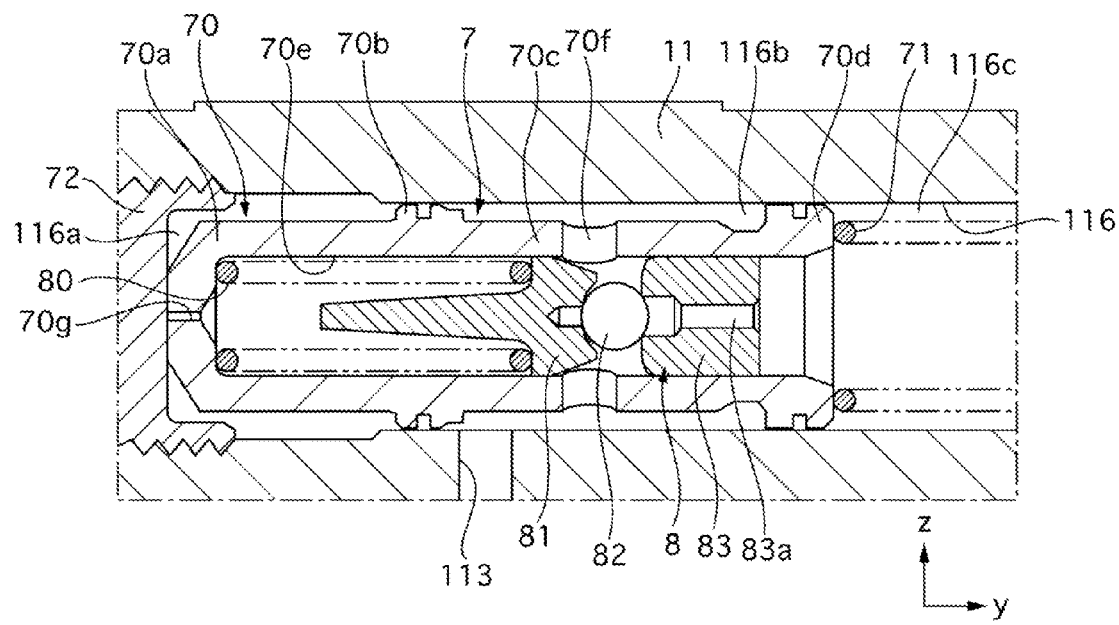
FIG. 11 is an enlarged sectional view of a portion of a variable displacement vane pump of Embodiment 6 of the invention where a control valve is provided.
Figure 12:
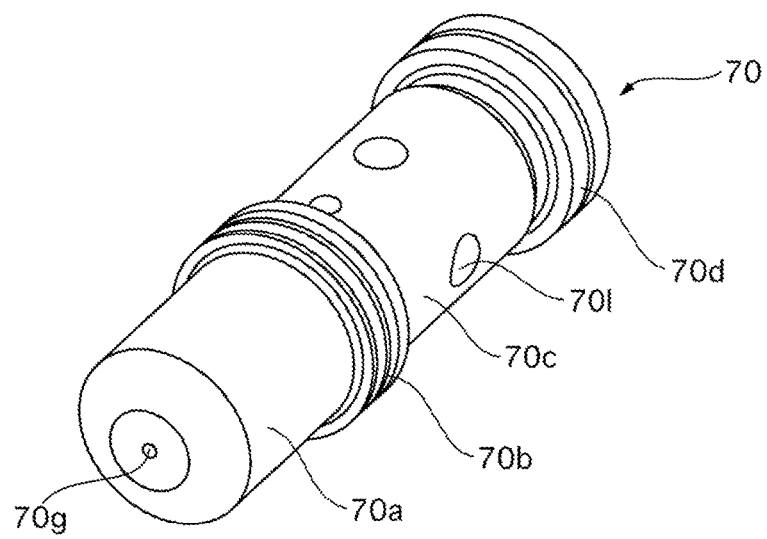
FIG. 12 is a perspective view of a spool of Embodiment 6.

[Configuration]
FIG. 11 is an enlarged sectional view of a portion where a control valve 7 is provided. FIG. 12 is a perspective view of a spool 70. A bypass line 70g is formed at a distal end of a spool 70 in a y axis negative direction. This bypass line 70g is formed far smaller in diameter than a low pressure chamber communication hole 70f. An opening portion of the bypass line 70g is closed by a plug member 72 when the spool 70 stays on a y axis negative direction side.

When the spool 70 moves in the y axis positive direction, although the interior of the relief valve accommodating hole 70e communicates with the high pressure chamber 116a via the bypass line 70g, the interior of the relief valve accommodating hole 70e also communicates with the low pressure chamber 116b. Therefore, the interior of the relief valve accommodating hole 70e is held to almost the suction chamber. On the other hand, although the pressure in the high pressure chamber 116a is slightly lower than the discharge pressure, the bypass line 70g is formed far smaller in diameter than the low pressure chamber communication hole 70f. Therefore, the pressure which is sufficiently higher than the suction pressure is applied to the interior of the high pressure chamber 116a.

[Function]
The opening portion of the bypass line 70g is closed by the plug member 72 when the spool 70 stays on the y axis negative direction side. The hydraulic fluid in the high pressure chamber 116a can be prevented from escaping into the low pressure chamber 116b in such a state that the discharge pressure is so small that the spool 70 stays stationary (or does not move), thereby making it possible to stabilize the discharge pressure of the variable displacement vane pump 1 when in an initial stage of driving.

[Advantage]
(13) The bypass line 70g is configured so that the communication of the bypass line 70g is cut off when the spool 70 is positioned at an axial end portion of a control valve accommodating hole 116, while the communication of the bypass line 70g is established when the spool 70 moves towards the other axial end portion.

Consequently, it is possible to stabilize the discharge pressure of the variable displacement vane pump 1 when in the initial stage of driving.

Other Embodiments

Thus, while the invention has been described heretofore based on Embodiments 1 to 6 thereof, the specific configurations of individual inventions are not limited by Embodiments 1 to 6, and design changes made without departing from the spirit and scope of the invention are also to be included in the invention.

Figure 13:
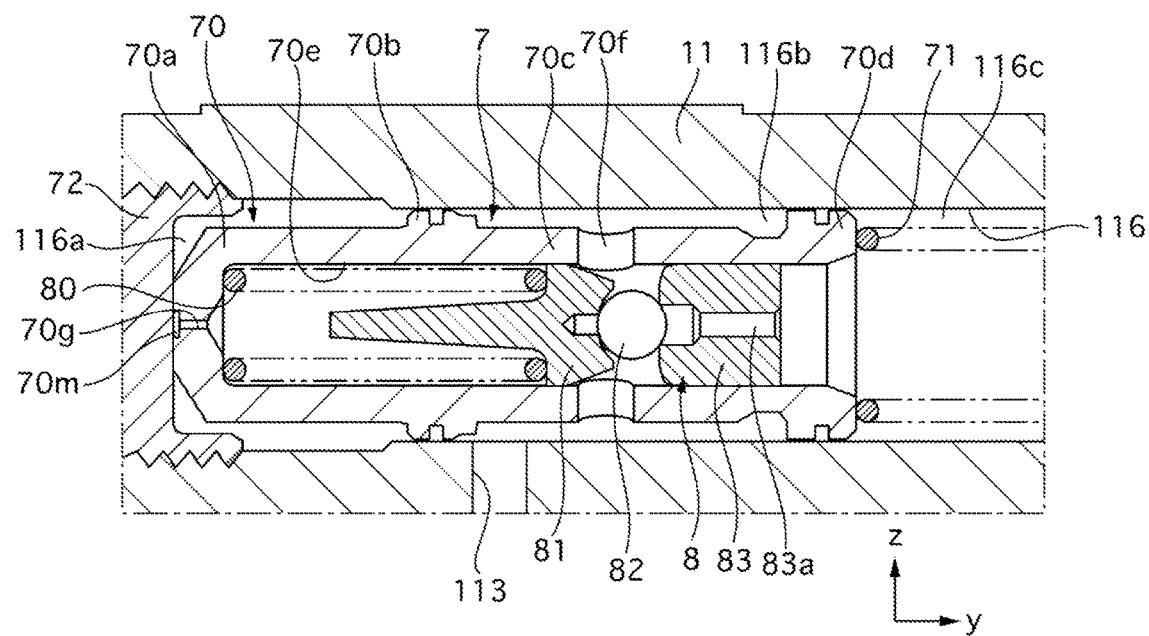
FIG. 13 is an enlarged sectional view of a portion of a variable displacement vane pump of a different embodiment of the invention where a control valve is provided.
Figure 14:
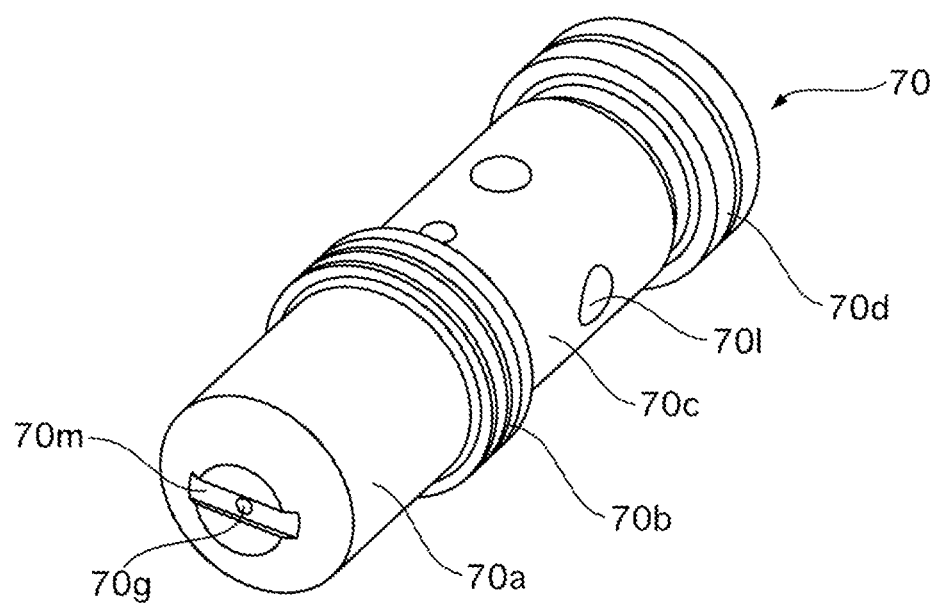
FIG. 14 is a perspective view of the spool of the different embodiment shown in FIG. 13.

For example, in Embodiment 1, while the bypass line 70g is described as being formed in the first small-diameter portion 70a of the spool 70, the bypass line 70g may be formed at a distal end of the spool 70. FIG. 13 is an enlarged sectional view of a portion where a control valve 7 is provided. FIG. 14 is a perspective view of a spool 70. A bypass line 70g is formed at a distal end of the spool 70 in a y axis negative direction. Additionally, a cutout portion 70m is formed at the distal end of the spool 70 in the y axis negative direction so as to run across the bypass line 70g. This cutout portion 70m prevents the bypass line 70g from being closed even when the spool 70 stays on a y axis negative direction side, whereby a communication can be established between a high pressure chamber 116a and a low pressure chamber 116b.

In Embodiments 1 to 6, the bypass line 70g (or the bypass line 58a) is provided so as to establish communication between the high pressure chamber 116a and the inner circumference of the spool 70. However, the invention is not necessarily limited to that configuration. The hydraulic fluid in anyone of the high pressure chamber 116a, the passage 21 and the discharge line 20 which is provided in the area upstream of the metering orifice 23 should configured so as to be released to either of the suction line 12a side or the discharge line 20 which is provided in the area downstream of the metering orifice 23.

The invention may be configured as follows.

(1) A variable displacement vane pump 1 for supplying a hydraulic fluid to a power steering system 90 of a vehicle comprises:

a pump housing 10 having a pump element accommodating portion 112 in an interior thereof;

a drive shaft 2 which is supported rotatably in the pump housing 10;

a rotor 3 which is accommodated in the pump element accommodating portion 112, which has a plurality of slits 31 which are formed to be aligned in a circumferential direction and which is driven to rotate by the drive shaft 2;

vanes 32 which are provided so as to be extendable from and retractable into the slits 31;

a cam ring 4 which is provided movably in the pump element accommodating portion 112 and which define a plurality of pump chambers 13 together with the rotor 3 and the vanes 32;

a first suction port 122 (a suction port) which is provided in the pump housing 10 and which opens to an area where some of the plurality of pump chambers 13 increase gradually displacements thereof as the rotor 3 rotates;

a first discharge port 123 (a discharge port) which is provided in the pump housing 10 and which opens to an area where the others of the plurality of pump chambers 13 decrease gradually displacements thereof as the rotor 3 rotates;

a suction line 12a which is provided in the pump housing 10 and which supplies a hydraulic fluid which is reserved in a reservoir tank to the first suction port 122;

a discharge line 20 which is provided in the pump housing 10 and which supplies a hydraulic fluid which is discharged from the first discharge port 123 to an exterior of the pump housing 10;

a first fluid pressure chamber A1 and a second fluid pressure chamber A2 which constitute a pair of spaces which are formed between the cam ring 4 and the pump element accommodating portion 112, the first fluid pressure chamber A1 being formed on a side where a volume thereof decreases when the cam ring 4 moves in a direction in which an eccentricity of the cam ring 4 relative to the rotor 3 increases, the second fluid pressure chamber A2 being formed on a side where a volume thereof increases when the cam ring 4 moves in the direction in which the eccentricity of the cam ring 4 relative to the rotor 3 increases;

a metering orifice 23 which is provided in the discharge line 20;

a control valve accommodating hole 116 which is provided in the pump housing 10 and which is formed so as to communicate with the first fluid pressure chamber A1 via a cam control pressure induction line 113;

a passage 21 (a high pressure induction line) which connects the first discharge port 123 with the control valve accommodating hole 116;

a spool 70 (a valve body) which is provided movably in the control valve accommodating hole 116;

a first land portion 70b which is, assuming that the spool 70 moves in an axial direction, provided at a one side of the spool 70 in the axial direction to restrict a flow of hydraulic fluid in a gap between the control valve accommodating hole 116 and the spool 70;

a second land portion 70d which is provided to the other side of the spool 70 in the axial direction with respect to the first land portion 70b to restrict the flow of hydraulic fluid in the gap between the control valve accommodating hole 116 and the spool 70;

a second small-diameter portion 70c (a small-diameter portion) which is formed smaller in diameter than the first land portion 70b and the second land portion 70d so that a space is formed between the control valve accommodating hole 116 and the spool 70 in an area between the first land portion 70b and the second land portion 70d in the axial direction;

three spaces which are formed in the control valve accommodating hole 116, the three spaces including a high pressure chamber 116a which is provided at the one side of the first land portion 70b in the axial direction and to which a hydraulic fluid existing upstream of the metering orifice 23 is supplied by way of the passage 21 which is provided at an axial side of the first land portion 70b in the axial direction, a middle pressure chamber 116c which is provided at the other axial side of the second land portion 70d in the axial direction and to which a hydraulic fluid existing downstream of the metering orifice 23 is supplied, and a low pressure chamber 116b which is provided between the first land portion 70b and the second land portion 70d, which constitutes a space defined between the control valve accommodating hole 116 and the second small-diameter portion 70c and which communicates with the suction line 12a;

a valve spring 71 (a biasing member) which is provided in the control valve accommodating hole 116 and which biases the spool 70 in the one side in the axial direction;

a control valve 7 which controls variably a communication amount by which the cam control pressure induction line 113 communicates with the high pressure chamber 116a and a communication amount by which the cam control pressure induction line 113 communicates with the low pressure chamber 116b as the spool 70 moves to thereby control a pressure in the first fluid pressure chamber A1 and an eccentricity of the cam ring 4; and a bypass line 70g which is formed so as not only to cause a hydraulic fluid in anyone of the high pressure chamber 116a, the passage 21 and the discharge line 20 which lies in an area which is upstream of the metering orifice 23 to flow directly to either of the suction line 12a side or the discharge line 20 which lies in an area which is downstream of the metering orifice 23 by performing a bypass but also to increase a bypass flow rate as a pressure in the hydraulic fluid existing downstream of the metering orifice 23 increases as a power steering system is activated to operate and which is configured to decrease a difference in pressure between the high pressure chamber 116a and the middle pressure chamber 116c by increasing the bypass flow rate, to increase the communication amount of the cam control pressure induction line 113 with the low pressure chamber 116b by moving the spool 70 to the one side in the axial direction as the pressure difference decreases, and to increase the eccentricity of the cam ring 4 by decreasing the pressure in the first fluid pressure chamber A1.

Consequently, the discharge flow rate of the variable displacement vane pump 1 can be increased when the steering wheel 91 is turned. On the other hand, the discharge flow rate can be decreased when the steering wheel 91 is not turned. Therefore, it is possible to make securing the necessary flow rate compatible with reducing the loss of energy by enhancing the efficiency of the engine.

(2) The bypass line 70g may be provided at any other portions than a gap defined between the control valve accommodating hole 116 and the first land portion 70b so as to establish a communication between the high pressure chamber 116a and the low pressure chamber 116b.

Consequently, the response of the control valve 7 in operation to an operation of the steering wheel 1 can be enhanced by releasing the pressure in the high pressure chamber 116a which is the control pressure of the control valve 7 to the low pressure side.

(3) In the variable displacement vane pump, the bypass line can have further an opening/closing valve which is provided halfway in the bypass line and which opens as a result of an increase in pressure downstream of the metering orifice.

By adopting this configuration, the communication of the bypass line is established or the communication area of the bypass line is increased only when it is required, whereby the leakage of hydraulic fluid when not in use can be restricted.

(4) In the variable displacement vane pump, the opening/closing valve may be formed so as to open when a pressure applied to the opening/closing valve is a predetermined pressure or larger.

By adopting this configuration, the discharge flow rate of the variable displacement vane pump can be reduced when the steering wheel is turned slightly, requiring no increase in discharge flow rate.

(5) In the variable displacement vane pump, the opening/closing valve may have further a stopper which restricts an opening amount thereof.

By adopting this configuration, the excessive increase in opening amount of the opening/closing valve 60 can be prevented, so as to saturate the increase in discharge flow rate.

(6) In the variable displacement vane pump, the opening/closing valve may be provided in a valve body of the control valve.

By adopting this configuration, even though the opening/closing valve is provided, it is possible to avoid the enlargement in size of the variable displacement vane pump.

(7) In the variable displacement vane pump, a flow rate of hydraulic fluid which passes through the bypass line may be held almost constant until a pressure of hydraulic fluid in anyone of the high pressure chamber, the high pressure induction line and the discharge line which lies in an area which is upstream of the metering orifice reaches a predetermined pressure.

By adopting this configuration, the discharge flow rate of the variable displacement vane pump can be reduced when the steering wheel is turned slightly, requiring no increase in discharge flow rate.

(8) In the variable displacement vane pump, a flow rate of hydraulic fluid which passes through the bypass line may be held almost constant when a pressure of hydraulic fluid in anyone of the high pressure chamber, the high pressure induction line and the discharge line which lies in an area which is upstream of the metering orifice is a predetermined pressure or larger.

By adopting this configuration, the excessive increase in discharge flow rate can be restricted so as to enhance the stability in steering.

(10) In the variable displacement vane pump, a configuration may be adopted in which a communication of the bypass line is cut off when the valve body is positioned at an end portion of the control valve accommodating portion in the axial direction thereof, while a communication of the bypass line is established when the valve body moves to the other side in the axial direction of the control valve accommodating portion.

By adopting this configuration, the discharge pressure of the variable displacement vane pump in the initial stage of driving can be stabilized.

(11) In the variable displacement vane, the bypass line may be configured so that a flow path area of the bypass line increases step by step, namely in a stepwise manner as the valve body moves to the other side in the axial direction.

By adopting this configuration, the response of the change in discharge flow rate to the change in pressure in the high pressure chamber 116a can be enhanced.

(12) In the variable displacement vane pump, the bypass line may be configured so that a flow path area of the bypass line decreases continuously as the valve body moves to the other side in the axial direction.

By adopting this configuration, the change in discharge flow rate can be restricted from becoming too sensitive to thereby enhance the stability in steering.

(13) A power steering system 90 mounted in a vehicle includes:

a steering mechanism 93 which turns steered wheels as a steering wheel 91 is operated to be turned;

a power cylinder 94 which is provided in the steering mechanism 93 and which includes a pair of fluid pressure chambers;

a pump unit 1 which supplies a hydraulic fluid to the power cylinder 94; and a rotary valve 99 which supplies the hydraulic fluid which is supplied from the pump unit selectively to the pair of fluid pressure chambers, and the pump unit 1 is a variable displacement vane pump 1 for supplying a hydraulic fluid to the power steering system 90 of the vehicle, including:

a pump housing 10 having a pump element accommodating portion 112 in an interior thereof;

a drive shaft 2 which is supported rotatably in the pump housing 10;

a rotor 3 which is accommodated in the pump element accommodating portion 112, which has a plurality of slits 31 which are formed to be aligned in a circumferential direction and which is driven to rotate by the drive shaft 2;

vanes 32 which are provided so as to be extendable from and retractable into the slits 31;

a cam ring 4 which is provided movably in the pump element accommodating portion 112 and which define a plurality of pump chambers 13 together with the rotor 3 and the vanes 32;

a first suction port 122 (a suction port) which is provided in the pump housing 10 and which opens to an area where some of the plurality of pump chambers 13 increase gradually displacements thereof as the rotor 3 rotates;

a first discharge port 123 (a discharge port) which is provided in the pump housing 10 and which opens to an area where the others of the plurality of pump chambers 13 decrease gradually displacements thereof as the rotor 3 rotates;

a suction line 12a which is provided in the pump housing 10 and which supplies a hydraulic fluid which is reserved in a reservoir tank to the first suction port 122;

a discharge line 20 which is provided in the pump housing 10 and which supplies a hydraulic fluid which is discharged from the first discharge port 123 to an exterior of the pump housing 10;

a first fluid pressure chamber A1 and a second fluid pressure chamber A2 which constitute a pair of spaces which are formed between the cam ring 4 and the pump element accommodating portion 112, the first fluid pressure chamber A1 being formed on a side where a volume thereof decreases when the cam ring 4 moves in a direction in which an eccentricity of the cam ring 4 relative to the rotor 3 increases, the second fluid pressure chamber A2 being formed on a side where a volume thereof increases when the cam ring 4 moves in the direction in which the eccentricity of the cam ring 4 relative to the rotor 3 increases;

a metering orifice 23 which is provided in the discharge line 20;

a control valve accommodating hole 116 which is provided in the pump housing 10 and which is formed so as to communicate with the first fluid pressure chamber A1 via a cam control pressure induction line 113;

a passage 21 (a high pressure induction line) which connects the first discharge port 123 with the control valve accommodating hole 116;

a spool 70 (a valve body) which is provided movably in the control valve accommodating hole 116;

a first land portion 70b which is, assuming that the spool 70 moves in an axial direction, provided at a one side of the spool 70 in the axial direction to restrict a flow of hydraulic fluid in a gap between the control valve accommodating hole 116 and the spool 70;

a second land portion 70d which is provided to the other side of the spool 70 in the axial direction with respect to the first land portion 70b to restrict the flow of hydraulic fluid in the gap between the control valve accommodating hole 116 and the spool 70;

a second small-diameter portion 70c (a small-diameter portion) which is formed smaller in diameter than the first land portion 70b and the second land portion 70d so that a space is formed between the control valve accommodating hole 116 and the spool 70 in an area between the first land portion 70b and the second land portion 70d in the axial direction;

three spaces which are formed in the control valve accommodating hole 116, the three spaces including a high pressure chamber 116a which is provided at the one side of the first land portion 70b in the axial direction and to which a hydraulic fluid existing upstream of the metering orifice 23 is supplied by way of the passage 21 which is provided at a one side of the first land portion 70b in the axial direction, a middle pressure chamber 116c which is provided at the other side of the second land portion 70d in the axial direction and to which a hydraulic fluid existing downstream of the metering orifice 23 is supplied, and a low pressure chamber 116b which is provided between the first land portion 70b and the second land portion 70d, which constitutes a space defined between the control valve accommodating hole 116 and the second small-diameter portion 70c and which communicates with the suction line 12a;

a valve spring 71 (a biasing member) which is provided in the control valve accommodating hole 116 and which biases the spool 70 in one side in the axial direction;

a control valve 7 which controls variably a communication amount by which the cam control pressure induction line 113 communicates with the high pressure chamber 116a and a communication amount by which the cam control pressure induction line 113 communicates with the low pressure chamber 116b as the spool 70 moves to thereby control a pressure in the first fluid pressure chamber A1 and an eccentricity of the cam ring; and a bypass line 70g which is formed so as not only to cause a hydraulic fluid in anyone of the high pressure chamber 116a, the passage 21 and the discharge line 20 which lies in an area which is upstream of the metering orifice 23 to flow directly to either of the suction line 12a side or the discharge line 20 which lies in an area which is downstream of the metering orifice 23 by performing a bypass but also to increase a bypass flow rate as a pressure in the hydraulic fluid existing downstream of the metering orifice 23 increases as a power steering system is activated to operate and which is configured to decrease a difference in pressure between the high pressure chamber 116a and the middle pressure chamber 116c by increasing the bypass flow rate, to increase the communication amount of the cam control pressure induction line 113 with the low pressure chamber 116b by moving the spool 70 to the one side in the axial direction as the pressure difference decreases, and to increase an eccentricity of the cam ring 4 by decreasing the pressure in the first fluid pressure chamber A1.

Consequently, the discharge flow rate of the variable displacement vane pump 1 can be increased when the steering wheel 91 is turned. On the other hand, the discharge flow rate can be decreased when the steering wheel 91 is not turned. Therefore, it is possible to make securing the necessary flow rate compatible with reducing the loss of energy by enhancing the efficiency of the engine.

(14) In the power steering system, the bypass line may be provided at any other portions than a gap defined between the control valve accommodating portion and the first land portion so as to establish a communication between the high pressure chamber 116a and the low pressure chamber 116b.

By adopting this configuration, the response of the control valve in operation to an operation of the steering wheel can be enhanced by releasing the pressure in the high pressure chamber 116a which is the control pressure of the control valve 7 to the low pressure side.

(15) In the power steering system, the bypass line can have further an opening/closing valve which is provided halfway in the bypass line and which opens as a result of an increase in pressure downstream of the metering orifice.

By adopting this configuration, the communication of the bypass line is established or the communication area of the bypass line is increased only when it is required, whereby the leakage of hydraulic fluid when not in use can be restricted.

(16) In the power steering system, the opening/closing valve may be formed so as to open when a pressure applied to the opening/closing valve is a predetermined pressure or larger.

By adopting this configuration, the discharge flow rate of the variable displacement vane pump can be reduced when the steering wheel is turned slightly, requiring no increase in discharge flow rate.

(17) In the power steering system, the opening/closing valve may have further a stopper which restricts an opening amount thereof.

By adopting this configuration, the excessive increase in opening amount of the opening/closing valve 60 can be prevented, so as to saturate the increase in discharge flow rate.

(18) In the power steering system, the opening/closing valve may be provided in a valve body of the control valve.

By adopting this configuration, even though the opening/closing valve is provided, it is possible to avoid the enlargement in size of the variable displacement vane pump.

(19) In the power steering system, a flow rate of hydraulic fluid which passes through the bypass line may be held almost constant until a pressure of hydraulic fluid in anyone of the high pressure chamber, the high pressure induction line and the discharge line which lies in an area which is upstream of the metering orifice reaches a predetermined pressure.

By adopting this configuration, the discharge flow rate of the variable displacement vane pump can be reduced when the steering wheel is turned slightly, requiring no increase in discharge flow rate.

(20) In the power steering system, a flow rate of hydraulic fluid which passes through the bypass line may be held almost constant when a pressure of hydraulic fluid in anyone of the high pressure chamber, the high pressure induction line and the discharge line which lies in an area which is upstream of the metering orifice is a predetermined pressure or larger.

By adopting this configuration, the excessive increase in discharge flow rate can be restricted so as to enhance the stability in steering.

Thus, while only several embodiments of the invention have been described, those skilled in the art to which the invention pertains will be able to easily understand that various modifications or improvements can be made to the embodiments described without departing substantially from the novel teachings and advantages of the invention. Consequently, it is intended to also include the resulting embodiments from those modifications or improvements in the technical scope of the invention.

This patent application is based upon and claims the benefit of priority from the prior Japanese Patent Application No. 2013-061666 filed on Mar. 25, 2013, the entire contents of which including the specification, claims, drawings and abstract are incorporated herein by reference.

DESCRIPTION OF REFERENCE NUMERALS AND CHARACTERS 1 variable displacement vane pump (pump unit); 2 drive shaft; 3 rotor; 4 cam ring; 7 control valve; 10 pump housing; 12a suction line; 20 discharge line; 21 passage (high pressure induction line); 23 metering orifice; 31 slit; 32 vane; 58a bypass line; 60 opening/closing valve; 70 spool (valve body); 70b first land portion; 70c second small-diameter portion (small-diameter portion); 70d second land portion; 70g bypass line; 71 valve spring (biasing member); 90 power steering system; 91 steering wheel; 92 steered wheel; 93 steering mechanism; 94 power cylinder; 99 rotary valve; 112 pump element accommodating portion; 113 cam control pressure induction line; 116 control valve accommodating hole; 116a high pressure chamber; 116b low pressure chamber; 116c middle pressure chamber; 122 first suction port (suction port); 123 first discharge port (discharge port); A1 first fluid pressure chamber; A2 second fluid pressure chamber

The invention claimed is:
1. A variable displacement vane pump for supplying a hydraulic fluid to a power steering system of a vehicle, comprising:
   a pump housing having a pump element accommodating portion in an interior of the pump housing;
   a drive shaft which is supported rotatably in the pump housing;
   a rotor which is accommodated in the pump element accommodating portion, which has a plurality of slits which are formed to be aligned in a circumferential direction and which is driven to rotate by the drive shaft;
   vanes which are provided so as to be extendable from and retractable into the slits;
   a cam ring which is provided movably in the pump element accommodating portion and which defines a plurality of pump chambers together with the rotor and the vanes;
   a suction port which is provided in the pump housing and which opens to an area where some of the plurality of pump chambers increase gradually displacements of the pump chambers as the rotor rotates;
   a discharge port which is provided in the pump housing and which opens to an area where the others of the plurality of pump chambers decrease gradually displacements of the pump chambers as the rotor rotates;
   a suction line which is provided in the pump housing and which supplies a hydraulic fluid which is reserved in a reservoir tank to the suction port;
   a discharge line which is provided in the pump housing and which supplies the hydraulic fluid which is discharged from the discharge port to an exterior of the pump housing;
   a first fluid pressure chamber and a second fluid pressure chamber which constitute a pair of spaces which are formed between the cam ring and the pump element accommodating portion, the first fluid pressure chamber being formed on a side where a volume of the pump chambers decreases when the cam ring moves in a direction in which an eccentricity of the cam ring relative to the rotor increases, the second fluid pressure chamber being formed on a side where a volume of the pump chambers increases when the cam ring moves in the direction in which the eccentricity of the cam ring relative to the rotor increases;
   a metering orifice which is provided in the discharge line;
   a control valve accommodating portion which is provided in the pump housing and which is formed so as to communicate with the first fluid pressure chamber via a cam control pressure induction line;

a high pressure induction line which connects the discharge port with the control valve accommodating portion;

a valve body which is provided movably in the control valve accommodating portion;

a first land portion which is, assuming that the valve body moves in an axial direction, provided at a one side of the valve body in the axial direction to restrict a flow of hydraulic fluid in a gap between the control valve accommodating portion and the valve body;

a second land portion which is provided to the other side of the valve body in the axial direction with respect to the first land portion to restrict the flow of hydraulic fluid in the gap between the control valve accommodating portion and the valve body;

a small-diameter portion which is formed smaller in diameter than the first land portion and the second land portion so that a space is formed between the control valve accommodating portion and the valve body in an area between the first land portion and the second land portion in the axial direction;

three spaces which are formed in the control valve accommodating portion, the three spaces including a high pressure chamber which is provided at the one side of the valve body in the axial direction and to which a hydraulic fluid existing upstream of the metering orifice is supplied by way of the high pressure induction line which is provided at an axial side of the first land portion in the axial direction, a middle pressure chamber which is provided at the other side of the valve body in the axial direction and to which a hydraulic fluid existing downstream of the metering orifice is supplied, and a low pressure chamber which is provided between the first land portion and the second land portion, which constitutes a space defined between the control valve accommodating portion and the small-diameter portion and which communicates with the suction line;

a biasing member which is provided in the control valve accommodating portion and which biases the valve body in the one side in the axial direction;

a control valve which controls variably a communication amount by which the cam control pressure induction line communicates with the high pressure chamber and a communication amount by which the cam control pressure induction line communicates with the low pressure chamber as the valve body moves to thereby control a pressure in the first fluid pressure chamber and an eccentricity of the cam ring; and a bypass line which is formed so as not only to cause a hydraulic fluid in any one of the high pressure chamber, the high pressure induction line and the discharge line which lies in an area which is upstream of the metering orifice to flow directly to either of the suction line side or the discharge line which lies in an area which is downstream of the metering orifice by performing a bypass but also to increase a bypass flow rate as a pressure in the hydraulic fluid existing downstream of the metering orifice increases as the power steering system is activated to operate and which is configured to decrease a difference in pressure between the high pressure chamber and the middle pressure chamber by increasing the bypass flow rate, to increase the communication amount of the cam control pressure induction line with the low pressure chamber by moving the valve body to the one side in the axial direction as the pressure difference decreases, and to increase the eccentricity of the cam ring by decreasing the pressure in the first fluid pressure chamber.

2. The variable displacement vane pump according to claim 1, wherein
the bypass line is provided at any other portions than a gap defined between the control valve accommodating portion and the first land portion so as to establish a communication between the high pressure chamber and the low pressure chamber.

3. The variable displacement vane pump according to claim 2, wherein
the bypass line has further an opening/closing valve which is provided halfway in the bypass line and which opens as a result of an increase in pressure downstream of the metering orifice.

4. The variable displacement vane pump according to claim 3, wherein
the opening/closing valve opens when a pressure applied to the opening/closing valve is a predetermined pressure or larger.

5. The variable displacement vane pump according to claim 3, wherein
the opening/closing valve has further a stopper which restricts an opening amount of the opening/closing valve.

6. The variable displacement vane pump according to claim 3, wherein
the opening/closing valve is provided in a valve body of the control valve.

7. The variable displacement vane pump according to claim 2, wherein
a flow rate of hydraulic fluid which passes through the bypass line is held almost constant until a pressure of hydraulic fluid in any one of the high pressure chamber, the high pressure induction line and the discharge line which lies in an area which is upstream of the metering orifice reaches a predetermined pressure.

8. The variable displacement vane pump according to claim 2, wherein
a flow rate of hydraulic fluid which passes through the bypass line is held almost constant when a pressure of hydraulic fluid in any one of the high pressure chamber, the high pressure induction line and the discharge line which lies in an area which is upstream of the metering orifice is a predetermined pressure or larger.

9. The variable displacement vane pump according to claim 2, wherein
the bypass line is provided in the control valve, and wherein
a flow path sectional area of the bypass line is variably controlled as a valve body of the opening/closing valve moves.

10. The variable displacement vane pump according to claim 9, wherein
a communication of the bypass line is cut off when the valve body is positioned at an end portion of the control valve accommodating portion in the axial direction of the control valve accommodating portion, while a communication of the bypass line is established when the valve body moves to the other side in the axial direction of the control valve accommodating portion.

11. The variable displacement vane pump according to claim 9, wherein
the bypass line is configured so that a flow path area of the bypass line increases in a stepwise manner as the valve body moves to the other side in the axial direction.

12. The variable displacement vane pump according to claim 9, wherein
the bypass line is configured so that a flow path area of the bypass line decreases continuously as the valve body moves to the other side in the axial direction.

13. A power steering system mounted in a vehicle, comprising:
a steering mechanism which turns steered wheels as a steering wheel is operated to be turned;
a power cylinder which is provided in the steering mechanism and which comprises a pair of fluid pressure chambers; a pump unit which supplies a hydraulic fluid to the power cylinder; and
a rotary valve which supplies the hydraulic fluid which is supplied from the pump unit selectively to the pair of fluid pressure chambers, wherein the pump unit comprises:
a pump housing having a pump element accommodating portion in an interior of the pump housing;
a drive shaft which is supported rotatably in the pump housing;
a rotor which is accommodated in the pump element accommodating portion, which has a plurality of slits which are formed to be aligned in a circumferential direction and which is driven to rotate by the drive shaft;
vanes which are provided so as to be extendable from and retractable into the slits;
a cam ring which is provided movably in the pump element accommodating portion and which define a plurality of pump chambers together with the rotor and the vanes;
a suction port which is provided in the pump housing and which opens to an area where some of the plurality of pump chambers increase gradually displacements of the pump chambers as the rotor rotates;
a discharge port which is provided in the pump housing and which opens to an area where the others of the plurality of pump chambers decrease gradually displacements of the pump chambers as the rotor rotates;
a suction line which is provided in the pump housing and which supplies a hydraulic fluid which is reserved in a reservoir tank to the suction port;
a discharge line which is provided in the pump housing and which supplies the hydraulic fluid which is discharged from the discharge port to an exterior of the pump housing;
a first fluid pressure chamber and a second fluid pressure chamber which constitute a pair of spaces which are formed between the cam ring and the pump element accommodating portion, the first fluid pressure chamber being formed on a side where a volume of the pump chambers decreases when the cam ring moves in a direction in which an eccentricity of the cam ring relative to the rotor increases, the second fluid pressure chamber being formed on a side where a volume of the pump chambers increases when the cam ring moves in the direction in which the eccentricity of the cam ring relative to the rotor increases;
a metering orifice which is provided in the discharge line;
a control valve accommodating portion which is provided in the pump housing and which is formed so as to communicate with the first fluid pressure chamber via a cam control pressure induction line;
a high pressure induction line which connects the discharge port with the control valve accommodating portion;
a valve body which is provided movably in the control valve accommodating portion;
a first land portion which is, assuming that the valve body moves in an axial direction, provided at a one side of the valve body in the axial direction to restrict a flow of hydraulic fluid in a gap between the control valve accommodating portion and the valve body;
a second land portion which is provided to the other side of the valve body in the axial direction with respect to the first land portion to restrict the flow of hydraulic fluid in the gap between the control valve accommodating portion and the valve body;
a small-diameter portion which is formed smaller in diameter than the first land portion and the second land portion so that a space is formed between the control valve accommodating portion and the valve body in an area between the first land portion and the second land portion in the axial direction;
three spaces which are formed in the control valve accommodating portion, the three spaces including a high pressure chamber which is provided at the one side of the valve body in the axial direction and to which a hydraulic fluid existing upstream of the metering orifice is supplied by way of the high pressure induction line which is provided at a one side of the first land portion in the axial direction, a middle pressure chamber which is provided at the other side of the valve body in the axial direction and to which a hydraulic fluid existing downstream of the metering orifice is supplied, and a low pressure chamber which is provided between the first land portion and the second land portion, which constitutes a space defined between the control valve accommodating portion and the small-diameter portion and which communicates with the suction line;
a biasing member which is provided in the control valve accommodating portion and which biases the valve body in the one side in the axial direction;
a control valve which controls variably a communication amount by which the cam control pressure induction line communicates with the high pressure chamber and a communication amount by which the cam control pressure induction line communicates with the low pressure chamber as the valve body moves to thereby control a pressure in the first fluid pressure chamber and an eccentricity of the cam ring; and
a bypass line which is formed so as not only to cause a hydraulic fluid in any one of the high pressure chamber, the high pressure induction line and the discharge line which lies in an area which is upstream of the metering orifice to flow directly to either of the suction line side or the discharge line which lies in an area which is downstream of the metering orifice by performing a bypass but also to increase a bypass flow rate as a pressure in the hydraulic fluid existing downstream of the metering orifice increases as the power steering system is activated to operate and which is configured to decrease a difference in pressure between the high pressure chamber and the middle pressure chamber by increasing the bypass flow rate, to increase the communication amount of the cam control pressure induction line with the low pressure chamber by moving the valve body to the one side in the axial direction as the pressure difference decreases, and to increase the eccentricity of the cam ring by decreasing the pressure in the first fluid pressure chamber.

14. The power steering system according to claim 13, wherein
the bypass line is provided at any other portions than a gap defined between the control valve accommodating portion and the first land portion so as to establish a communication between the high pressure chamber and the low pressure chamber.

15. The power steering system according to claim 14, wherein
the bypass line has further an opening/closing valve which is provided halfway in the bypass line and which opens as a result of an increase in pressure downstream of the metering orifice.

16. The power steering system according to claim 15, wherein
the opening/closing valve opens when a pressure applied to the opening/closing valve is a predetermined pressure or larger.

17. The power steering system according to claim 15, wherein
the opening/closing valve has further a stopper which restricts an opening amount of the opening/closing valve.

18. The power steering system according to claim 15, wherein
the opening/closing valve is provided in a valve body of the control valve.

19. The power steering system according to claim 14, wherein
a flow rate of hydraulic fluid which passes through the bypass line is held almost constant until a pressure of hydraulic fluid in any one of the high pressure chamber, the high pressure induction line and the discharge line which lies in an area which is upstream of the metering orifice reaches a predetermined pressure.

20. The power steering system according to claim 14, wherein
a flow rate of hydraulic fluid which passes through the bypass line is held almost constant when a pressure of hydraulic fluid in any one of the high pressure chamber, the high pressure induction line and the discharge line which lies in an area which is upstream of the metering orifice is a predetermined pressure or larger.

* * * * *